(12) United States Patent
Candelore

(10) Patent No.: US 7,565,546 B2
(45) Date of Patent: Jul. 21, 2009

(54) SYSTEM, METHOD AND APPARATUS FOR SECURE DIGITAL CONTENT TRANSMISSION

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 706 days.

(21) Appl. No.: 10/764,682

(22) Filed: Jan. 23, 2004

(65) Prior Publication Data

US 2004/0158721 A1 Aug. 12, 2004

Related U.S. Application Data

(63) Continuation-in-part of application No. 10/387,163, filed on Mar. 11, 2003, which is a continuation-in-part of application No. 09/497,393, filed on Feb. 3, 2000, now Pat. No. 6,697,489.

(60) Provisional application No. 60/126,805, filed on Mar. 30, 1999.

(51) Int. Cl.
*H04K 1/00* (2006.01)

(52) U.S. Cl. .................. 713/182; 713/155; 713/156; 713/165; 713/193; 380/239; 380/201; 380/200; 380/210; 380/255; 726/4; 726/26

(58) Field of Classification Search ............... 713/182
See application file for complete search history.

(56) References Cited

U.S. PATENT DOCUMENTS

| | | | |
|---|---|---|---|
| 3,852,519 A | 12/1974 | Court | 178/5.1 |
| 4,381,519 A | 4/1983 | Wilkinson et al. | |
| 4,419,693 A | 12/1983 | Wilkinson | |
| 4,521,853 A | 6/1985 | Guttag | |
| 4,634,808 A | 1/1987 | Moerder | |
| 4,700,387 A | 10/1987 | Hirata | |
| 4,703,351 A | 10/1987 | Kondo | |

(Continued)

FOREIGN PATENT DOCUMENTS

CA 2328645 7/2001

(Continued)

OTHER PUBLICATIONS

"How Networks Work, Millennium Edition", *Que Corporation*, (Sep. 2000),88-89.

(Continued)

*Primary Examiner*—Kambiz Zand
*Assistant Examiner*—Yonas Bayou
(74) *Attorney, Agent, or Firm*—Blakely, Sokoloff, Taylor & Zafman LLP

(57) ABSTRACT

A mating key gateway is adapted to retrieve a mating key, which is used to encrypt a program key that is used to scramble digital content prior to transmission to a digital device. According to one embodiment of the invention, the mating key gateway comprises a processor, a communication interface and a non-volatile storage unit. The non-volatile storage unit is configured to store a mating key lookup table to identify a targeted server to retrieve the mating key therefrom based on the information received from a headend.

22 Claims, 17 Drawing Sheets

U.S. PATENT DOCUMENTS

| | | |
|---|---|---|
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. .................. 380/15 |
| 4,772,947 A | 9/1988 | Kono |
| 4,785,361 A | 11/1988 | Brotby |
| 4,788,589 A | 11/1988 | Kondo |
| 4,802,215 A | 1/1989 | Mason ........................ 380/21 |
| 4,803,725 A | 2/1989 | Horne et al. .................. 380/44 |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. .................... 380/20 |
| 4,953,023 A | 8/1990 | Kondo |
| 4,989,245 A | 1/1991 | Bennett |
| 4,995,080 A | 2/1991 | Bestler et al. ................. 380/21 |
| 5,018,197 A | 5/1991 | Jones et al. ................... 380/20 |
| 5,023,710 A | 6/1991 | Kondo et al. |
| 5,091,936 A | 2/1992 | Katznelson et al. ........... 380/19 |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. ................ 380/9 |
| 5,258,835 A | 11/1993 | Kato |
| 5,319,707 A | 6/1994 | Wasilewski et al. |
| 5,325,432 A | 6/1994 | Gardeck et al. ............... 380/21 |
| 5,327,502 A | 7/1994 | Katata et al. |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. ...... 370/110.1 |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan ....................... 380/25 |
| 5,539,823 A | 7/1996 | Martin ......................... 380/20 |
| 5,539,828 A | 7/1996 | Davis |
| 5,555,305 A | 9/1996 | Robinson et al. .............. 380/14 |
| 5,561,713 A | 10/1996 | Suh .............................. 380/10 |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. .................. 387/7 |
| 5,608,448 A | 3/1997 | Smoral et al. .................. 348/7 |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis ..................... 386/46 |
| 5,726,702 A | 3/1998 | Hamaguchi et al. |
| 5,732,346 A | 3/1998 | Lazaridis et al. |
| 5,742,680 A | 4/1998 | Wilson ......................... 380/16 |
| 5,742,681 A | 4/1998 | Giachetti et al. .............. 380/20 |
| 5,751,280 A | 5/1998 | Abbott et al. ................. 345/302 |
| 5,751,743 A | 5/1998 | Takizawa |
| 5,751,813 A | 5/1998 | Dorenbos .................... 380/49 |
| 5,754,650 A | 5/1998 | Katznelson ................... 380/15 |
| 5,757,417 A | 5/1998 | Aras et al. ..................... 348/10 |
| 5,757,909 A | 5/1998 | Park |
| 5,768,539 A | 6/1998 | Metz et al. |
| 5,784,464 A * | 7/1998 | Akiyama et al. ............. 713/155 |
| 5,787,171 A | 7/1998 | Kubota et al. |
| 5,787,179 A | 7/1998 | Ogawa et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. ............... 380/10 |
| 5,805,712 A | 9/1998 | Davis |
| 5,805,762 A | 9/1998 | Boyce et al. |
| 5,809,147 A | 9/1998 | De Lange et al. ............. 380/28 |
| 5,815,146 A | 9/1998 | Youden et al. ............... 345/327 |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette ..................... 348/7 |
| 5,894,516 A | 4/1999 | Brandenburg ................. 380/4 |
| 5,897,218 A | 4/1999 | Nishimura et al. ........... 386/94 |
| 5,915,018 A | 6/1999 | Aucsmith ...................... 380/4 |
| 5,917,915 A | 6/1999 | Hirose |
| 5,922,048 A | 7/1999 | Emura ......................... 709/219 |
| 5,923,486 A | 7/1999 | Suyiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. ................. 345/302 |
| 5,973,722 A | 10/1999 | Wakai et al. |
| 5,999,622 A | 12/1999 | Yasukawa et al. .............. 380/4 |
| 5,999,698 A | 12/1999 | Nakai et al. .................. 386/125 |
| 6,005,561 A | 12/1999 | Hawkins et al. ............. 345/327 |
| 6,011,849 A | 1/2000 | Orrin ........................... 380/42 |
| 6,012,144 A | 1/2000 | Pickett ......................... 713/201 |
| 6,016,348 A | 1/2000 | Blatter et al. |
| 6,021,199 A | 2/2000 | Ishibashi ..................... 380/10 |
| 6,021,201 A | 2/2000 | Bakhle et al. |
| 6,026,164 A | 2/2000 | Sakamoto et al. |

| | | | | | | |
|---|---|---|---|---|---|---|
| 6,028,932 | A | 2/2000 | Park | 6,456,985 | B1 | 9/2002 | Ohtsuka |
| 6,049,613 | A | 4/2000 | Jakobsson ............... 380/47 | 6,459,427 | B1 | 10/2002 | Mao et al. ............... 345/327 |
| 6,055,314 | A | 4/2000 | Spies et al. | 6,463,152 | B1 | 10/2002 | Takahashi ............... 380/201 |
| 6,055,315 | A | 4/2000 | Doyle et al. | 6,466,671 | B1 | 10/2002 | Maillard et al. |
| 6,057,872 | A | 5/2000 | Candelore ............... 348/3 | 6,505,032 | B1 | 1/2003 | McCorkle et al. .......... 455/41 |
| 6,058,186 | A | 5/2000 | Enari ............... 380/10 | 6,510,554 | B1 | 1/2003 | Gordon et al. ............. 725/90 |
| 6,058,192 | A | 5/2000 | Guralnick et al. | 6,519,693 | B1 | 2/2003 | Debey |
| 6,061,451 | A | 5/2000 | Muratani et al. | 6,526,144 | B2 | 2/2003 | Markandey et al. |
| 6,064,748 | A | 5/2000 | Hogan ............... 382/100 | 6,529,526 | B1 | 3/2003 | Schneidewend |
| 6,065,050 | A | 5/2000 | DeMoney ............... 709/219 | 6,543,053 | B1 | 4/2003 | Li et al. ............... 725/88 |
| 6,069,647 | A | 5/2000 | Sullivan et al. | 6,549,229 | B1 | 4/2003 | Kirby et al. |
| 6,072,872 | A | 6/2000 | Chang et al. | 6,550,008 | B1 | 4/2003 | Zhang et al. |
| 6,072,873 | A | 6/2000 | Bewick ............... 380/217 | 6,557,031 | B1 | 4/2003 | Mimura et al. |
| 6,073,122 | A | 6/2000 | Wool | 6,587,561 | B1 | 7/2003 | Sered et al. ............... 380/241 |
| 6,088,450 | A | 7/2000 | Davis et al. | 6,609,039 | B1 | 8/2003 | Schoen ............... 700/94 |
| 6,105,134 | A | 8/2000 | Pinder et al. | 6,640,145 | B2 | 10/2003 | Hoffberg et al. ............ 700/83 |
| 6,108,422 | A | 8/2000 | Newby et al. | 6,640,305 | B2 | 10/2003 | Kocher et al. |
| 6,115,821 | A | 9/2000 | Newby et al. | 6,650,754 | B2 | 11/2003 | Akiyama et al. |
| 6,118,873 | A | 9/2000 | Lotspiech et al. | 6,654,389 | B1 | 11/2003 | Brunheroto et al. |
| 6,125,349 | A | 9/2000 | Maher | 6,678,740 | B1 | 1/2004 | Rakib et al. ............... 9/247 |
| 6,134,237 | A | 10/2000 | Brailean et al. | 6,681,326 | B2 | 1/2004 | Son et al. ............... 713/150 |
| 6,134,551 | A | 10/2000 | Aucsmith | 6,697,489 | B1 * | 2/2004 | Candelore ............... 380/200 |
| 6,138,237 | A | 10/2000 | Ruben et al. | 6,697,944 | B1 | 2/2004 | Jones et al. |
| 6,154,206 | A | 11/2000 | Ludtke | 6,707,696 | B1 * | 3/2004 | Turner et al. ............... 365/96 |
| 6,157,719 | A * | 12/2000 | Wasilewski et al. ......... 380/210 | 6,714,650 | B1 | 3/2004 | Maillard et al. |
| 6,181,334 | B1 | 1/2001 | Freeman et al. | 6,754,276 | B1 | 6/2004 | Harumoto et al. |
| 6,185,369 | B1 | 2/2001 | Ko et al. ............... 386/125 | 6,772,340 | B1 | 8/2004 | Peinado et al. |
| 6,185,546 | B1 | 2/2001 | Davis | 6,788,690 | B2 | 9/2004 | Harri |
| 6,189,096 | B1 | 2/2001 | Haverty | 6,788,882 | B1 | 9/2004 | Geer et al. |
| 6,192,131 | B1 | 2/2001 | Geer, Jr. et al. | 6,826,185 | B1 | 11/2004 | Montanaro et al. |
| 6,199,053 | B1 | 3/2001 | Herbert et al. | 6,834,110 | B1 | 12/2004 | Marconcini et al. |
| 6,204,843 | B1 | 3/2001 | Freeman et al. ............ 345/327 | 6,895,128 | B2 | 5/2005 | Bohnenkamp |
| 6,209,098 | B1 | 3/2001 | Davis | 6,904,520 | B1 | 6/2005 | Rosset et al. |
| 6,215,484 | B1 | 4/2001 | Freeman et al. ............ 345/327 | 6,917,684 | B1 | 7/2005 | Tatebayashi et al. |
| 6,222,924 | B1 | 4/2001 | Salomaki | 6,938,162 | B1 | 8/2005 | Nagai et al. |
| 6,223,290 | B1 | 4/2001 | Larsen et al. | 6,964,060 | B2 * | 11/2005 | Kamperman et al. ......... 725/31 |
| 6,226,618 | B1 | 5/2001 | Downs et al. | 6,976,166 | B2 | 12/2005 | Herley et al. |
| 6,229,895 | B1 | 5/2001 | Son et al. ............... 380/200 | 7,039,802 | B1 * | 5/2006 | Eskicioglu et al. .......... 713/156 |
| 6,230,194 | B1 | 5/2001 | Frailong et al. | 7,039,938 | B2 * | 5/2006 | Candelore ............... 725/87 |
| 6,230,266 | B1 | 5/2001 | Perlman et al. | 7,058,806 | B2 * | 6/2006 | Smeets et al. ............... 713/166 |
| 6,233,577 | B1 | 5/2001 | Ramasubramani et al. | 7,065,213 | B2 | 6/2006 | Pinder |
| 6,236,727 | B1 | 5/2001 | Ciacelli et al. | 7,127,619 | B2 | 10/2006 | Unger et al. |
| 6,240,553 | B1 | 5/2001 | Son et al. ............... 725/95 | 7,146,007 | B1 | 12/2006 | Maruo et al. |
| 6,246,720 | B1 | 6/2001 | Kutner et al. | 7,203,311 | B1 * | 4/2007 | Kahn et al. ............... 380/201 |
| 6,247,127 | B1 | 6/2001 | Vandergeest ............... 713/100 | 7,353,541 | B1 * | 4/2008 | Ishibashi et al. ............ 726/26 |
| 6,256,747 | B1 | 7/2001 | Inohara et al. | 2001/0030959 | A1 | 10/2001 | Ozawa et al. |
| 6,263,506 | B1 | 7/2001 | Ezaki et al. | 2001/0036271 | A1 | 11/2001 | Javed |
| 6,266,416 | B1 | 7/2001 | Sigbjornsen et al. | 2001/0042043 | A1 | 11/2001 | Shear et al. |
| 6,266,480 | B1 | 7/2001 | Ezaki et al. | 2002/0003881 | A1 | 1/2002 | Reitmeier et al. |
| 6,272,538 | B1 | 8/2001 | Holden et al. | 2002/0021805 | A1 | 2/2002 | Schumann et al. |
| 6,278,783 | B1 | 8/2001 | Kocher et al. | 2002/0026587 | A1 | 2/2002 | Talstra et al. |
| 6,289,455 | B1 | 9/2001 | Kocher et al. | 2002/0046406 | A1 | 4/2002 | Chelehmal et al. ............ 725/87 |
| 6,292,568 | B1 | 9/2001 | Akins et al. ............... 380/239 | 2002/0047915 | A1 | 4/2002 | Misu |
| 6,292,892 | B1 | 9/2001 | Davis | 2002/0059425 | A1 | 5/2002 | Belfiore et al. ............... 709/226 |
| 6,307,939 | B1 | 10/2001 | Vigarie ............... 380/210 | 2002/0083438 | A1 | 6/2002 | So et al. |
| 6,311,012 | B1 | 10/2001 | Cho et al. ............... 386/98 | 2002/0090090 | A1 | 7/2002 | Van Rijnsoever et al. |
| 6,324,288 | B1 | 11/2001 | Hoffman | 2002/0094084 | A1 | 7/2002 | Wasilewski et al. |
| 6,330,672 | B1 | 12/2001 | Shur ............... 713/176 | 2002/0097322 | A1 | 7/2002 | Monroe et al. |
| 6,351,538 | B1 | 2/2002 | Uz | 2002/0108035 | A1 | 8/2002 | Herley et al. ............... 713/165 |
| 6,351,813 | B1 | 2/2002 | Mooney et al. | 2002/0116705 | A1 | 8/2002 | Perlman et al. |
| 6,378,130 | B1 | 4/2002 | Adams | 2002/0126890 | A1 | 9/2002 | Katayama et al. |
| 6,389,533 | B1 | 5/2002 | Davis et al. | 2002/0129243 | A1 | 9/2002 | Nanjundiah ............... 713/160 |
| 6,389,537 | B1 | 5/2002 | Davis et al. | 2002/0150239 | A1 | 10/2002 | Carny et al. |
| 6,415,031 | B1 | 7/2002 | Colligan et al. ............ 380/200 | 2002/0164022 | A1 | 11/2002 | Strasser et al. |
| 6,415,101 | B1 | 7/2002 | deCarmo et al. ............ 386/105 | 2002/0170053 | A1 | 11/2002 | Peterka et al. |
| 6,418,169 | B1 | 7/2002 | Datari | 2002/0184506 | A1 | 12/2002 | Perlman |
| 6,424,717 | B1 | 7/2002 | Pinder et al. | 2002/0194613 | A1 | 12/2002 | Unger ............... 725/118 |
| 6,430,361 | B2 | 8/2002 | Lee ............... 386/98 | 2002/0196939 | A1 | 12/2002 | Unger et al. ............... 380/216 |
| 6,442,689 | B1 | 8/2002 | Kocher | 2003/0009669 | A1 | 1/2003 | White et al. |
| 6,445,738 | B1 | 9/2002 | Zdepski et al. | 2003/0021412 | A1 | 1/2003 | Candelore et al. ............ 380/217 |
| 6,449,718 | B1 | 9/2002 | Rucklidge et al. .......... 713/168 | 2003/0026423 | A1 | 2/2003 | Unger et al. ............... 380/217 |
| 6,452,923 | B1 | 9/2002 | Gerszberg et al. | 2003/0035540 | A1 | 2/2003 | Freeman et al. |
| 6,453,115 | B1 | 9/2002 | Boyle | 2003/0035543 | A1 | 2/2003 | Gillon et al. |

| | | | |
|---|---|---|---|
| 2003/0046686 A1 | 3/2003 | Candelore et al. ............ 725/31 |
| 2003/0059047 A1 | 3/2003 | Iwamura |
| 2003/0063615 A1 | 4/2003 | Iuoma et al. ................ 370/401 |
| 2003/0072555 A1 | 4/2003 | Yap et al. |
| 2003/0081630 A1 | 5/2003 | Mowery et al. ............ 370/466 |
| 2003/0081776 A1 | 5/2003 | Candelore ................... 380/200 |
| 2003/0084284 A1 | 5/2003 | Ando et al. |
| 2003/0097662 A1 | 5/2003 | Russ et al. |
| 2003/0108199 A1 | 6/2003 | Pinder et al. |
| 2003/0123664 A1 | 7/2003 | Pedlow, Jr. et al. .......... 380/218 |
| 2003/0123849 A1 | 7/2003 | Nallur et al. .................. 386/68 |
| 2003/0133570 A1 | 7/2003 | Candelore et al. ........... 380/210 |
| 2003/0145329 A1 | 7/2003 | Candelore ..................... 725/87 |
| 2003/0152224 A1 | 8/2003 | Candelore et al. ........... 380/210 |
| 2003/0152226 A1 | 8/2003 | Candelore et al. ........... 380/218 |
| 2003/0156718 A1 | 8/2003 | Candelore et al. ........... 380/211 |
| 2003/0159139 A1 | 8/2003 | Candleor et al. .............. 725/25 |
| 2003/0159140 A1 | 8/2003 | Candelore |
| 2003/0159152 A1 | 8/2003 | Lin et al. ...................... 725/87 |
| 2003/0174837 A1 | 9/2003 | Candelore et al. ........... 380/210 |
| 2003/0174844 A1* | 9/2003 | Candelore ................... 380/277 |
| 2003/0188164 A1 | 10/2003 | Okimoto et al. |
| 2003/0198223 A1 | 10/2003 | Mack et al. ................. 370/392 |
| 2003/0204717 A1 | 10/2003 | Kuehnel |
| 2003/0226149 A1 | 12/2003 | Chun et al. ................... 725/78 |
| 2004/0003008 A1 | 1/2004 | Wasilewski et al. ......... 707/200 |
| 2004/0021764 A1 | 2/2004 | Driscoll, Jr. et al. |
| 2004/0047470 A1 | 3/2004 | Candelore ................... 380/240 |
| 2004/0049688 A1 | 3/2004 | Candelore et al. ........... 713/191 |
| 2004/0049690 A1 | 3/2004 | Candelore et al. ........... 713/193 |
| 2004/0049691 A1 | 3/2004 | Candelore et al. ........... 713/193 |
| 2004/0049694 A1 | 3/2004 | Candelore ................... 713/200 |
| 2004/0068440 A1* | 4/2004 | Porato .......................... 705/14 |
| 2004/0078575 A1 | 4/2004 | Morten et al. ............... 713/176 |
| 2004/0086127 A1 | 5/2004 | Candelore |
| 2004/0100510 A1 | 5/2004 | Milic-Frayling et al. |
| 2004/0111613 A1 | 6/2004 | Shen-Orr et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1* | 8/2004 | Candelore ................... 380/239 |
| 2004/0165586 A1 | 8/2004 | Read et al. ................... 370/389 |
| 2004/0187161 A1 | 9/2004 | Cao ............................ 725/110 |
| 2004/0240668 A1 | 12/2004 | Bonan et al. |
| 2004/0267602 A1 | 12/2004 | Gaydos et al. |
| 2005/0004875 A1 | 1/2005 | Kontio et al. |
| 2005/0066357 A1 | 3/2005 | Ryal |
| 2005/0169473 A1 | 8/2005 | Candelore |
| 2006/0136976 A1 | 6/2006 | Coupe et al. |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 440 | 9/1995 |
| EP | 0 674 441 | 9/1995 |
| EP | 0833517 | 4/1998 |
| EP | 0866615 | 9/1998 |
| EP | 1187483 | 3/2002 |
| JP | 7067028 | 3/1995 |
| JP | 11159162 | 6/1999 |
| JP | 11243534 | 10/2002 |
| JP | 2003330897 | 11/2003 |
| WO | WO 86/07224 | 12/1986 |
| WO | WO-8607224 | 12/1986 |
| WO | WO-94/10775 | 5/1994 |
| WO | WO-9738530 | 10/1997 |
| WO | WO00/31964 | 6/2000 |
| WO | WO0051039 | 8/2000 |
| WO | WO 01 11819 | 2/2001 |
| WO | IB-WO 01/65762 A2 | 9/2001 |
| WO | WO01/78386 | 10/2001 |

OTHER PUBLICATIONS

Benini, Luca, et al., "Energy-Efficient Data Acrambling on Memory-Processor Interfaces", *ISLPED'03*, Aug. 25-27, 2003, Seoul, Korea, (2003),26-29.

Brown, Jessica, "The Interactive Commercial, Coming Soon to a TV Near You".

Liu, Zheng, et al., "Motion Vector Encryption in Multimedia Streaming", *Proccedings of the 10th International Multimedia Modeling Conference 2004 IEEE*, (2004),1-8.

NCUBE, "Digital Program Insertion", (May 2001).

NCUBE, "Smooth Ad Insertion Deployment Protects Revenues", (2004).

OPENTV, "OPENTV to Showcase Several Advanced Interactive Television Solutions at IBC 2004", (Sep. 6, 2004).

Pazarci, Melih, et al., "Data Embedding in Scrambled Digital Video", *Computers and Communication Proceedings, Eighth IEEE International Symposium on 2003, vol. 1 (ISCC 2003*, (2003),498-503.

Thawani, Amit, et al., "Context Aware Personalized Ad Insertion in an Interactive TV Environment".

"Ad Agencies and Advertisers To Be Empowered with Targeted Ad Delivered by Television's Prevailing Video Servers", *Article Business Section of The New York Times*, (Dec. 20, 2001).

"CLearPlay: The Technology of Choice", from web site, http://www.clearplay.com/what.asp, *ClearPlay 2001-2003*.

"McCormac Hack Over Cablemodem", *HackWatch,* http://www.hackwatch.com/cablemodbook.html, (Aug. 10, 1998).

"Message Authentication with Partial Encryption", *Research disclosure RD 296086,* (Dec. 10, 1998).

"Metro Media PVR-DVD-MP3-Web", *Internet publication from* www.metrolink.com, (undated).

"New Digital Copy protection Proposal Would Secure Authorized Copies", *PR Newswire*, (Nov. 13, 1998),1-3.

"Passage Freedom to Choose", *Sony Electronics Inc.,* (2003).

"Pre-Encryption Profiles—Concept Overview and Proposal", *Rev. 1.2 as submitted to the Open CAS consortium on Dec. 28, 2000.*

Agi, Iskender, et al., "An Empirical Study of Secure MPEG Video Transmissions", *IEEE, Proceedings of SNDSS 96,* (1996),137-144.

Alattar, Adnan, et al., "Evaluation of Selective Encryption Techniques for Secure Transmission of MPEG-Compressed Bit-Streams", *IEEE,* (1999),IV-340 to IV-343.

Alattar, Adnan M., et al., "Improved Selective Encryption Techniques for Secure Transmission of MPEG Video Bit-Streams", *IEEE,* (1999),256-260.

Dittmann, Jana, et al., "Multimedia and Security Workshop at ACM Multimedia", Bristol, U.K., (Sep. 1998).

Dondeti, Lakshminath R., et al., "A Dual Encryption Protocol for Scalable Secure Multicasting", *1999 International Symposium on Computers and Communication,* Jul. 6-8, 1999.

Gulwani, Sumit, "A Report on Security Issues in Multimedia", *Department of Computer Science and Engineering, Indian Istitute of Technology Kanpur,* Course Notes,(Apr. 30, 2000),pp. 10-14.

Haberman, Seth, "Visible World—A High Impact Approach to Customized Television Advertising", (Dec. 2001).

Koenen, Rob H., et al., "The Long March to Interoperable Digital Rights Management", *IEEE,* (2004),1-17.

Kunkelmann, Thomas, "Applying Encryption to Video Communication", *Multimedia and Security Workshop at ACM Multimedia ?98.* Bristol, U.K., (Sep. 1998),41-47.

Lookabaugh, Tom, et al., "Selective Encryption and MPEG-2", *ACM Multimedia '03,* (Nov. 2003).

Naor, Moni, et al., "Certificate Revocation and Certificate update", Apr. 2000, *IEEE Journal on Selected Areas in Communications, IEEE,* vol. 18, No. 4, (2000),561-570.

Park, Joon S., et al., "Binding Identities and Attributes Using Digitally Singed Certificates", *IEEE,* (2000).

Piazza, Peter, "E-Signed, Sealed, and Delivered", *Security Management*, vol. 45, No. 4, (Apr. 2001),72-77.

Qiao, Lintian, et al., "Comparison of MPEG Encryption Algorithms", *Department of Computer Science, University of Illinois at Urbana-Champaign,* (Jan. 17, 1998),1-20.

Robert, Amaud, et al., "Digital Cable: The Key to Your Content", *Access Intelligence's Cable Group,* online at http:www.cableworld.com/ct/archives/0202/0202digitalrights.htm, (Feb. 2002).

Seachange International, "Dynamic-Customized TV Advertising Creation and Production Tools", *Web Site Literature.*

Seachange International, "Transport Streams Insertion of Video in the Compressed Digital Domain", *Web Site Literature,* (2000).

Shavik, Kirstnamurthy, "Securant Technologies Delivers Broad PKI Integration to Enable Standards Based Security", *Business Wires,* (Oct. 4, 1999).

Shi, Changgui, et al., "An Efficient MPEG Video Encryption Algorithm", *1998 IEEE, Department of Computer Sciences, Purdue Univeristy,* West Lafayette, IN, 381-386.

Spanos, George A., et al., "Performance Study of a Selective Encryption Scheme for the Security of Networked, Real-Time Video", *IEEE,* (1995),2-10.

Taylor, Jim, "DVD Demystified—The Guidebook for DVD-Video and DVD-ROM", *Pub. McGraw-Hill, ISBN: 0-07-064841-7,* pp. 134-147, (1998),134-147.

Wu, Chung-Ping, et al., "Fast Encryption Methods for Audiovisual Data Confidentiality", *SPIE International Symposia on Information Technologies* (Boston, Ma., USA), (Nov. 2000),284-295

Wu, S. Felix, et al., "Run-Time Performance Evaluation for a Secure MPEG System Supporting Both Selective Watermarking and Encryption", *submitted to JSAC special issue on Copyright and Privacy Protection,* (Mar. 1, 1997).

Wu, Tsung-Li, et al., "Selective Encryption and Watermarking of MPEG Video (Extended Abstract)", *International Conference on Image Science, Systems, and Technology, CISST?97,* (Feb. 17, 1997).

Zeng, Wenjun, et al., "Efficient Frequency Domain Video Scrambling for Content Access Control", *In Proc. ACM Multimedia,* (Nov. 1999).

Aravind, H., et al., "Image and Video Coding Standards", *AT&T Technical Journal,* (Jan./Feb. 1993),67-68.

Gonzalez, R. C., et al., "Digital Image Processing", *Addison Wesley Publishing Comapny, Inc.,* (1992),346-348.

Kim, et al., "Bit Rate Reduction Algorithm for a Digital VCR", *IEEE Transactions on Consumer Electronics,* vol. 37, No. 3, (Aug. 1, 1992),267-274.

Kondo, et al., "A New Concealment Method for Digital VCRs", *IEEE Visual Signal Processing and Communication,* Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR" (1991).

Menezes, Alfred J., et al., "Handbook of Applied Cryptography", *CRC Press,* 551-553.

NHK Laboratories Note, "Error Correction, Concealment and Shuffling", No. 424, (Mar. 1994),29-44.

Park, et al., "A Simple Concealment for ATM Bursty Cell Loss", *IEEE Transactions on Consumer Electronics,* No. 3, (Aug. 1998),704-709.

Tom, et al., "Packet Video for Cell Loss Protection Using Deinterleaving and Scrambling", *ICASSP 91: 1991 International Conference on Acoustics, Speech and Signal Processing,* vol. 4, (Apr. 1991),2857-2860.

Zhu, et al., "Coding and Cell-Loss Recovery in DCT-Based Packet Video", *IEEE Transactions on Circuits and Systems for Video Tecnology,* No. 3, NY,(Jun. 3, 1993).

* cited by examiner

Mating Key Lookup Table 590

| Mating Key Generator | Mating Key(s) |
|---|---|
| MKG1 | Mating key1 |
| MKG 2 | Mating keys 3, 5, 6 |
| ... | ... |

*Figure 9C*

| Entitlement Management Message | |
|---|---|
| Serial Num | (64 bits) |
| EMM Length | (16 bits) |
| Mating Key Generator | (64 bits) |
| Key ID #1 | (16 bits) |
| Encrypted Key #1 | (64 bits) |
| ... | |
| Key ID #M | (16 bits) |
| Encrypted Key #M | (64 bits) |

*Figure 11*

SYSTEM, METHOD AND APPARATUS FOR SECURE DIGITAL CONTENT TRANSMISSION

CROSS-REFERENCE TO RELATED APPLICATIONS

This application is a continuation-in-part of U.S. patent application Ser. No. 10/387,163 filed Mar. 11, 2003, which is a continuation-in-part application of U.S. patent application Ser. No. 09/497,393 filed Feb. 3, 2000 now U.S. Pat. No. 6,697,489, which is based on a U.S. Provisional Application No. 60/126,805, filed on Mar. 30, 1999.

BACKGROUND

1. Field

Embodiments of the invention relate to content protection. More specifically, one embodiment of the invention relates to an apparatus and method for enabling the exchange of information in a secured manner in order to protect digital content being transmitted.

2. General Background

Analog communication systems are rapidly giving way to their digital counterparts. Digital television is currently scheduled to be available nationally. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. It is noted that one of the currently proposed schemes involve symmetric key cryptographic techniques to encode components of a compliant device. This allows for the authentication of any digital device prior to transmission of the digital content in order to determine whether the device is compliant.

However, this scheme fails to provide a technique that has universal application and does not impose rigorous key management as normally associated with symmetric key-based systems.

BRIEF DESCRIPTION OF THE DRAWINGS

Embodiments of the invention are illustrated by way of example and not by way of limitation in the figures of the accompanying drawings, in which like references indicate similar elements and in which:

FIG. 9C a third exemplary embodiment of a mating key lookup table stored within the storage unit 560 of FIG. 8;

FIG. 11 is an exemplary embodiment of an entitlement management message (EMM) routed to a digital device from the headend;

DETAILED DESCRIPTION

Various embodiments of the invention relate to an apparatus, system and method for protecting the transfer of data. In one embodiment, such protection involves the descrambling or decrypting of digital content from one or more service providers in digital devices. Examples of a "service provider" include, but are not limited to a terrestrial broadcaster, cable operator, direct broadcast satellite (DBS) company, a company providing content for download via the Internet, or any similar sources of content.

A "trusted third party" is an entity that is responsible for ensuring that information is protected and accurately distributed. It is contemplated that the trusted third party may be selected so as to have no affiliation with one of the content providers, service providers or the digital device manufacturers. Examples of trusted third parties may include, but is not limited or restricted to a governmental entity, financial institution, an independent security entity (e.g., Verisign of Mountain View, Calif.) or the like.

In the following description, certain terminology is used to describe features of the invention. For example, the terms "component", "block" or "logic" are representative of hardware and/or software configured to perform one or more functions. For instance, examples of "hardware" include, but are not limited or restricted to an integrated circuit such as a processor (e.g., microprocessor, application specific integrated circuit, a digital signal processor, a micro-controller, etc.). Of course, the hardware may be alternatively implemented as a finite state machine or even combinatorial logic.

An example of "software" includes executable code in the form of an application, an applet, a routine or even a collection of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

The term "program data" generally represents any type of information being transferred over a secure content delivery system. Examples of program data include system information, one or more entitlement control messages or entitlement management messages, digital content, and/or other data, each of which will be described briefly below. A "message" is a collection of bits sent as a bit stream, a packet or successive packets.

The term "transmission medium" generally represents a communication pathway between two devices. Examples of transmission medium include, but are not limited to electrical wire, optical fiber, cable, a wireless link established by wireless signaling circuitry, or the like.

Figure 1:
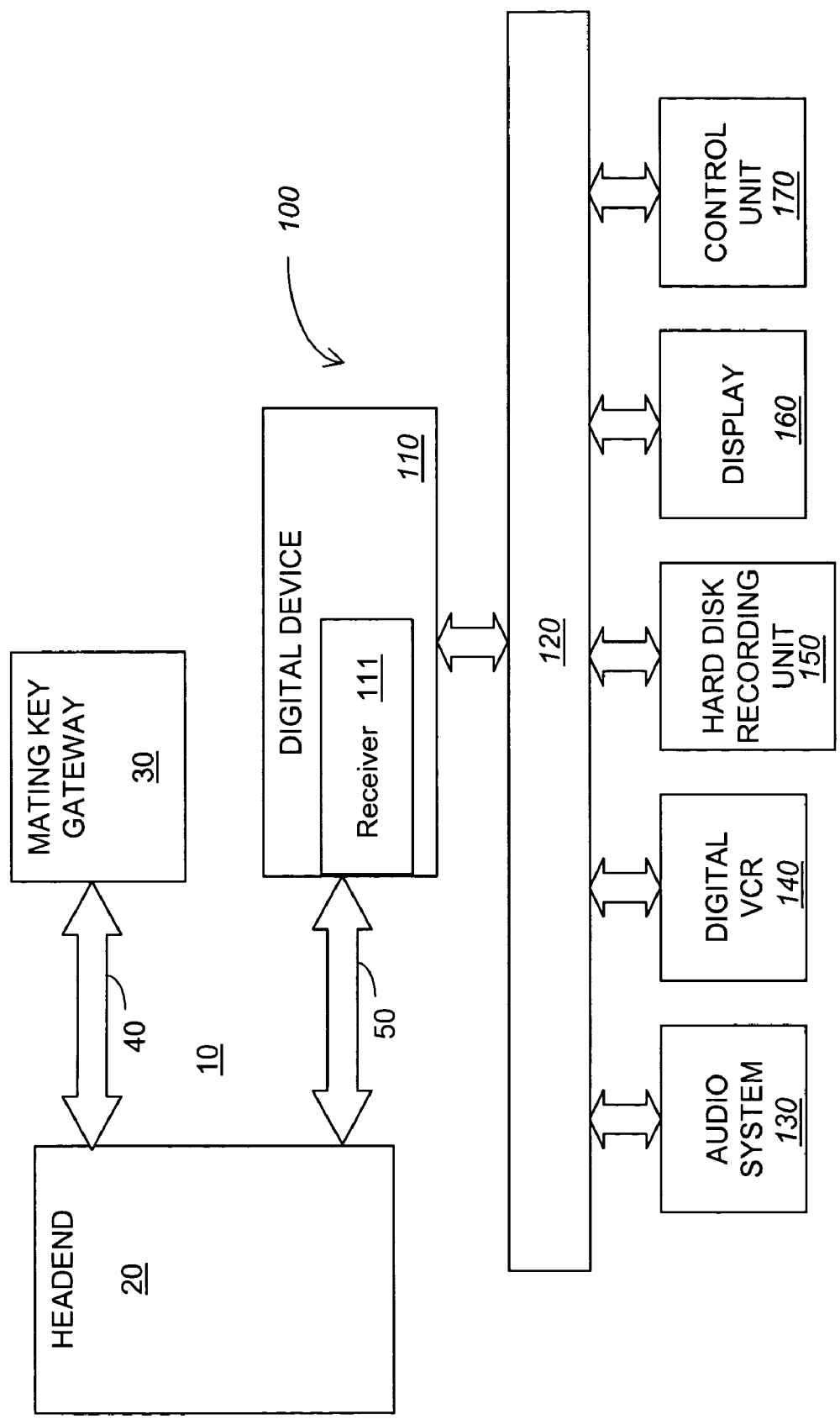
FIG. 1 is a first exemplary embodiment of a secure content delivery system.

Referring to FIG. 1, a first exemplary embodiment of a secure content delivery system 10 that comprises an entertainment system 100 is shown. Herein, the secure content delivery system 10 comprises a headend 20 that communicates with a mating key gateway 30 over a transmission medium 40. The headend 20 receives one or more mating keys from mating key gateway 30. These mating keys may be used to encrypt a program key, which is defined as information used to encrypt digital content. Examples of a program key include, but are not limited or restricted to one or more control words, one or more service keys, one or more precursor keys, or one or more keys used to derive a control word, service key or precursor key. The headend 20 encrypts the digital content before transmission to the entertainment system 100 via a transmission medium 50. The mating keys may be transmitted along with the digital content or are recreated at the entertainment system 100.

The entertainment system 100 comprises a digital device 110 for receiving information including program data from one or more service providers. The program data may be propagated as a digital bit stream for example. The digital device 110 may be implemented in a wide range of configurations, such as a set-top box, television, computer, audio-playback device (e.g., digital radio), audio-recording device (e.g., MP3 player), video-recording device (e.g., TIVO® recorder by TiVo Inc. of Alviso, Calif.), or the like.

For instance, the digital device 110 may be configured in accordance with an embedded security architecture, a split security architecture, or an external security architecture. As an embedded architecture, in one embodiment, digital device 110 is implemented as a set-top box that comprises fixed, internal circuitry supporting both entitlement management and descrambling operations.

Alternatively, in accordance with a split security architecture embodiment, the digital device 110 may be adapted to receive a removable smart card that handles entitlement management, while descrambling of incoming program data is controlled by internal circuitry.

Yet, in accordance with an external security embodiment, the digital device 110 may be a "point-of-deployment" product, e.g. called CableCARD in U.S. cable, with a PCMCIA form factor card handling both entitlement management and descrambling operations by sending and receiving messages over either an In-Band channel or an Out-of-Band channel.

Of course, as yet another alternative embodiment, external security type may also be split so that the PCMCIA card may be configured to handle descrambling operations, but adapted to communicate with a smart card for handling entitlement management. These and other embodiments of the digital device 110 may be implemented while still falling within the spirit and scope of the invention.

The digital device 110 comprises a receiver ill, which processes the incoming program data and places digital content in a perceivable format (e.g., viewable and/or audible). The receiver 111 may be configured as a decoder as described below. As mentioned previously, the program data may include at least one or more of the following: system information, entitlement control messages, entitlement management messages and digital content.

Herein, "system information" may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with an entitlement control message (ECM), which is generally used to regulate access to a particular channel or service.

An "Entitlement Management Message" (EMM) may be used to deliver entitlements (sometimes referred to as "privileges") to the digital receiver 111. Examples of certain entitlements may include, but are not limited to access rights, access parameters, and/or descrambling keys. A descrambling key is generally a code that is required by descrambler logic to recover data in the clear from a scrambled format based on the entitlements granted. Finally, "content" in the program data stream may include images, audio, video or any combination thereof. The content may be in a scrambled or clear format.

As shown, the digital device 110 may be coupled to other components in the entertainment system 100 via a transmission medium 120. The transmission medium 120 operates to transmit control information and data, such as a portion of the program data for example, between the digital device 110 and other components in the entertainment system 100.

Depending on the type of product corresponding to the digital device 110, the entertainment system 100 may comprise an audio system 130 coupled to the transmission medium 120. A digital VCR 140, such as a D-VHS VCR, may also be coupled to the digital device 110 and other components of the entertainment system 100 through the transmission medium 120.

A hard disk recording unit 150 may also be coupled to digital device 110 and other components via transmission medium 120. Display 160 may include a high definition television display, a monitor or another device capable of processing digital video signals, or a monitor capable of processing analog video signals after digital-to-analog conversion. Finally, a control unit 170 may be coupled to the transmission medium 120. The control unit 170 may be used to coordinate and control the operation of some or each of the components on the entertainment system 100.

The content of a digital program may be transmitted in scrambled form. In one embodiment, as part of the program data, access requirements may be transmitted along with the scrambled content to the digital device 110 that is implemented with the receiver 111 functioning as a conditional access unit, especially when the digital device 110 operates as a set-top box. An "access requirement" is a restrictive parameter used to determine if the digital device 110 implemented with conditional access functionality is authorized to descramble the scrambled content for viewing or listening purposes. For example, the access requirement may be a key needed to perceive (view and/or listen to) the content, a service tag associated with a given service provider, or even a particular descrambling software code.

When a scrambled program is received by the digital device 110, the access requirements for the program are compared to the entitlements that the digital device 110 actually has. In order for the digital device 110 to display the scrambled content in clear form, in one embodiment, the access requirements for the program are compared to the entitlements of the digital device 110. The entitlements may state that the digital device 110 is entitled to view/playback content from a given content provider such as Home Box Office (HBO), for example. The entitlements may also include one or more keys needed to descramble the content. The entitlements also may define the time periods for which the digital device 110 may descramble the content.

Thus, in one embodiment, access requirements and entitlements form a part of the access control system to determine whether a user is authorized to view a particular program. It is contemplated that the description below focuses on mechanisms to recover audio/visual content such as television broadcasts, purchased movies and the like. However, it is contemplated that the invention is also applicable to the descrambling of audible content only (e.g., digitized music files).

The access requirements may be delivered to the digital device 110 using Entitlement Control Messages (ECMs) delivered in packets with different packet identifiers (PIDs). Each packet with the corresponding PID may contain the access requirements associated with a given service or feature. The content that is delivered to the digital device 110 may also include packet with a large number of different PIDs, thus enabling special revenue features, technical features, or other special features to be performed locally.

Figure 2:
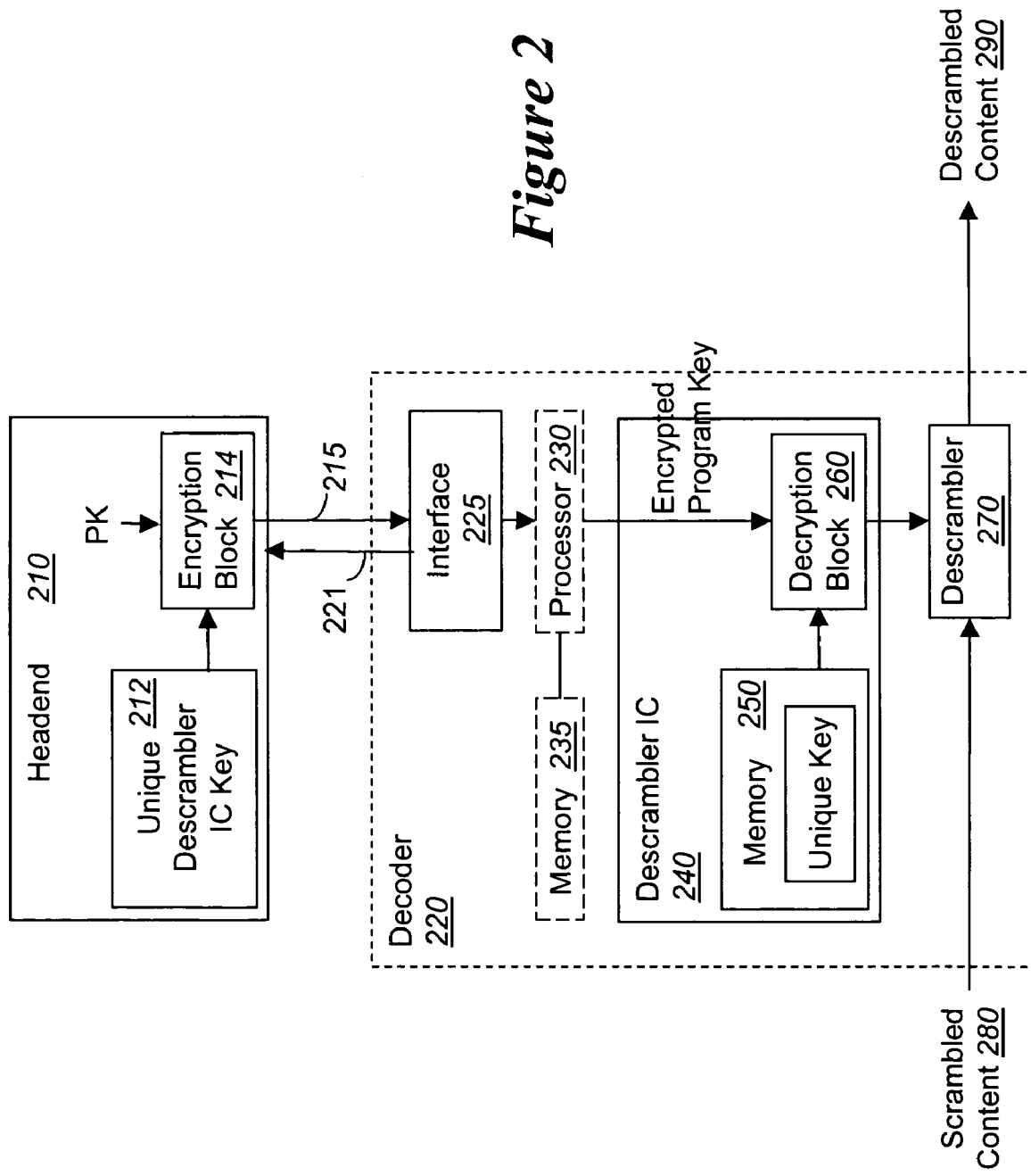
FIG. 2 is a second exemplary embodiment of a secure content delivery system.

Referring now to FIG. 2, a second exemplary embodiment of a secure content delivery system 200 that comprises a decoder 220 adapted for communications with a headend 210 is shown. For this embodiment, the decoder 220 comprises an interface 225, an optional processor 230, an optional memory 235, a descrambler integrated circuit (IC) 240 and a descrambler unit 270.

In communication over a one-way or two-way network 215, headend 210 maintains the access rights for a digital device operating as the decoder 220. The headend 210 can deliver one or more encrypted program keys to the decoder 220 (hereinafter generally referred to as an "encrypted key"). Produced by encryption block 214, the encrypted key is based on information stored in memory 212. This information is equivalent to or a derivation of at least one unique key (referred to as "Unique Key") stored in a memory 250 of the descrambler IC 240.

In accordance with one embodiment of the invention, the encrypted key may be stored locally within the memory 235 to facilitate transitions from one channel to another. However, in accordance with other embodiments of the invention, the encrypted key may be stored in memory 250 of the descrambler IC 240 or loaded as needed from the headend 210 into the descrambler IC 240 and decrypted only by decryption block 260 in the descrambler IC 240 using the Unique Key stored in memory 250.

In one embodiment, the program key is a control word which is supplied to the descrambler unit 270 to descramble the content directly. In another embodiment, the program key is a service key used to decrypt one or more control words, which are received in-band with the scrambled content and subsequently used by the descrambler unit 270 for descrambling purposes.

Figure 3:
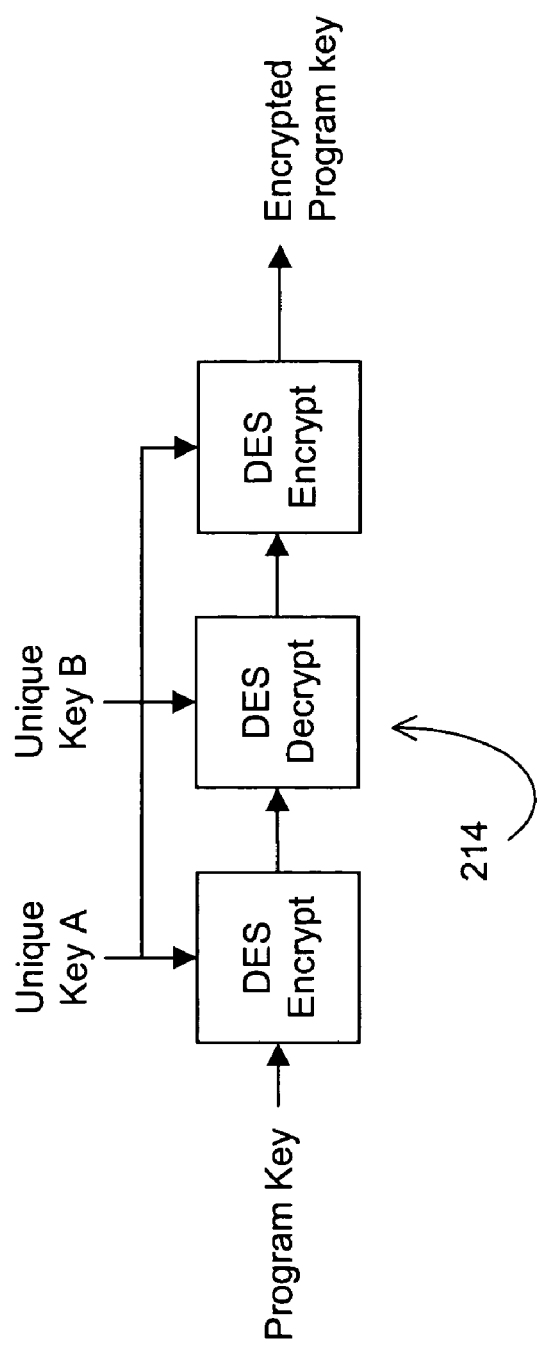
FIGS. 3 and 4 are exemplary embodiments of methods for encrypting and decrypting a control word.
Figure 4:
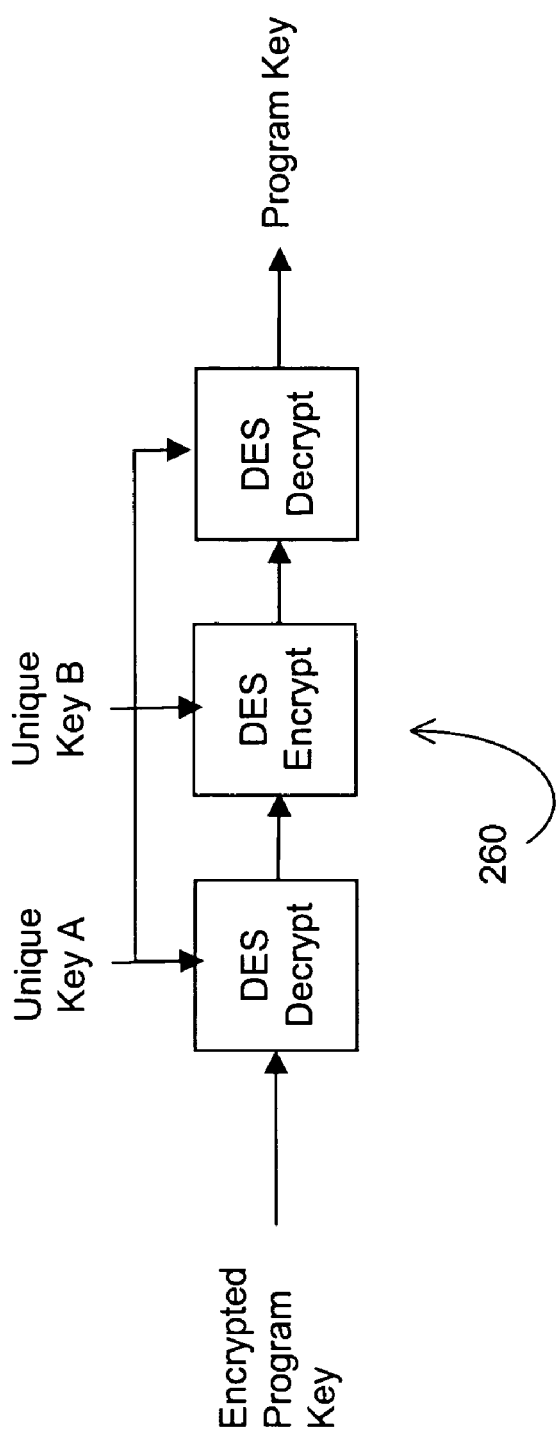

Embodiments of the encryption and decryption functions performed by encryption block 214 and decryption block 260 are shown in FIGS. 3 and 4. These operations transform the program key based on the Unique Key (or derivations thereof) stored in memories 212 and 250. Any encryption algorithm may be used such as DES, M6, DVB Common Scrambling Algorithm (CSA), Advanced Encryption Standard (AES) or Triple DES (3DES) as shown.

Referring back to FIG. 2, the descrambler IC 240 may use AES or 3DES to decrypt the key in decryption block 260. The decrypted program key is then used by descrambler unit 270 to descramble the scrambled content 280 and output clear content 290. It is contemplated that the algorithm used to encrypt and decrypt the key may be different than the algorithm used to scramble and descramble the content. These different proprietary algorithms may be considered as anti-piracy measures to invalidate clone hardware.

Since the encryption and decryption of the program key is local to the digital device, it is possible to phase in the deployment of increasingly more robust encryption. For example, single DES may be initially deployed, and later double or 3DES can be phased in with no consequence to already fielded paired units of digital devices. The key length of the Unique Key 250 may be at least as large as the decrypted key, to help reduce attacks on the Unique Key by hackers.

The headend 210 can deliver one or more program keys on a channel or "tier of service" basis in EMMs. The program keys are encrypted, stored locally in decoder 220 and used by a processor 230 as needed when tuning to different channels. Because the digital devices may be fielded in high volume as compared to the headend 210, eliminating the smart cards (and corresponding cryptographic processors), from the digital devices greatly reduces the cost of implementing a pay-TV system in a network.

While this embodiment works in one-way (non-IPPV) broadcast networks, it also performs in two-way, interactive networks, where the program keys for a particular service are requested, such as IPPV or VOD purchases or any other non-subscription service. As shown, a return communication path 221 is used to request the key because the ability to grant access to a new service is performed by the headend 210 instead of a local controlling cryptographic processor.

In order to avoid overload problems at the headend 210 caused by a large number of simultaneous impulse buys of IPPV programs, a Free Preview period can be determined and IPPV programs can be marketed in advance of the actual viewing. In this embodiment, program keys (e.g., service keys) for individual shows or movies may be requested by the decoder 220 and delivered ahead of time. For example, interactive networks, such as a cable system having the return communication path 221, which is in-band (IB) or out-of-band (OOB) such as via a DOCSIS modem or Out-of-Band transmitter/receiver for example, can deliver a Request for Program Key (RPK) message from the decoder 220 to the headend 210. Alternatively, the decoder 220 may request the program keys in real-time for each program accessed.

A controller (not shown) at the headend 210 processes the RPK message. The RPK message may contain an address of the decoder 220 as well as information needed to identify the channel to be viewed. The RPK message may be encrypted, if desired, for non-repudiation and prevention of denial of service attacks, such as IPPV or VOD requests for example.

Upon receipt of the RPK message, the headend 210 accesses entries of an access control list (listing each entitlement of the decoder 220) and verifies the decoder is authorization to receive a particular program key (e.g., service key). If authorized, the headend server 210 sends the program key (encrypted using a key identical to or a derivative of the Unique Key 250) to the decoder 220.

Figure 5:
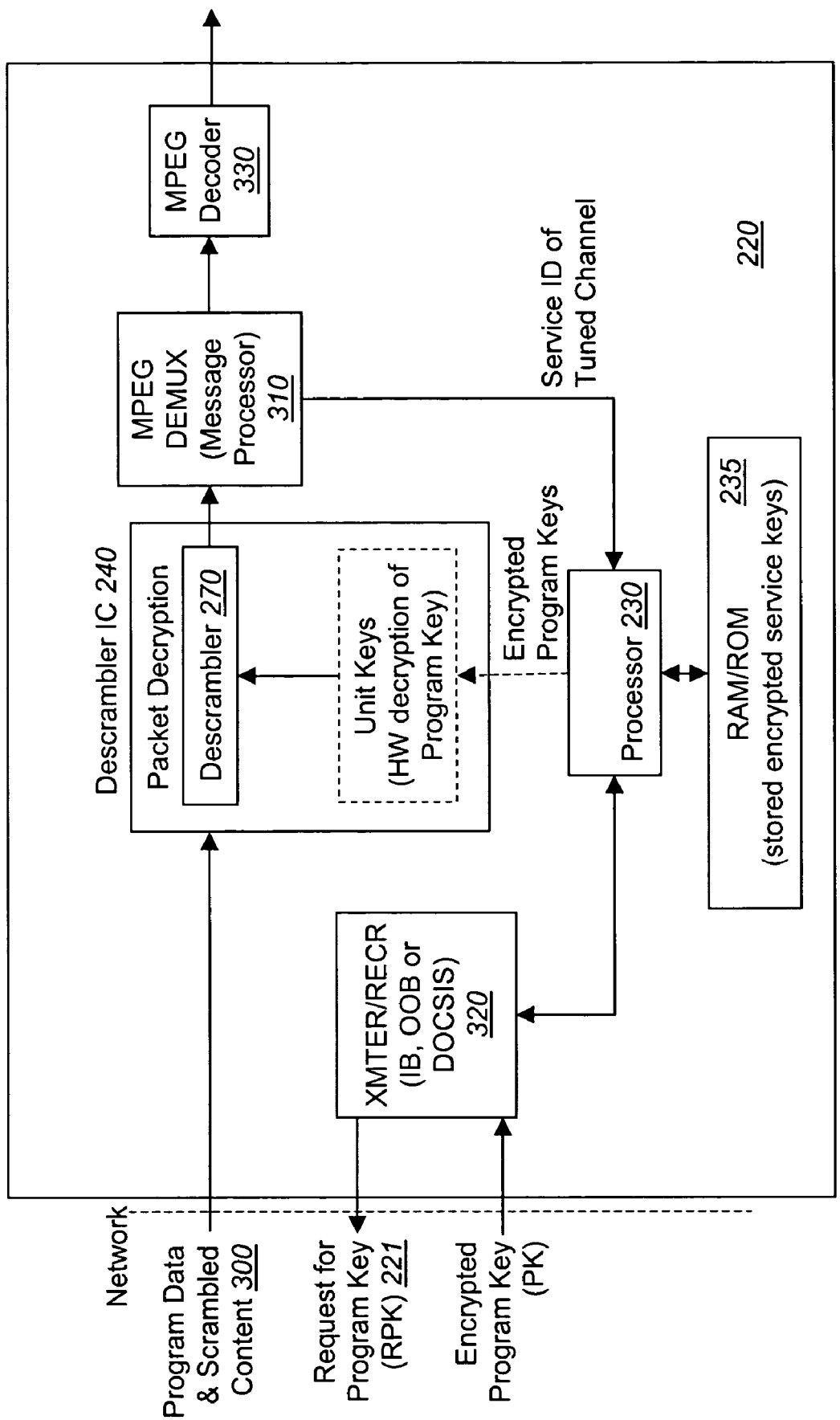
FIG. 5 is a more detailed illustration of the decoder adapted to the headend of FIG. 2.

FIG. 5 provides a more detailed illustration of the decoder 220 of FIG. 2 adapted to the headend 210 for request and receipt of one or more program keys (e.g., service keys). According to one embodiment, program data 300 such as an Entitlement Control Message (ECM) or meta-data associated with an Electronic Program Guide (EPG) as well as scrambled content is provided to the decoder 220 by a service provider. The program data 300 includes scrambled content as well as conveys at least an identifier of the desired channel or service (referred to as "Channel or Service ID"). In the event that the program data 300 is an IPPV or VOD program, the program data 300 may further include a Program identifier (PID). This is because no ECM processing other than identifying the appropriate encrypted key from memory, and using it to write it into the appropriate storage element (or register) of the descrambler IC 240 needs to be performed.

An MPEG Demultiplexer 310 operates as a message processor to extract the Channel or Service ID upon detection in program data. The Channel or Service ID are routed to the processor 230 which, in combination with transmitter/receiver logic 320, generates a Request for Program Key (RPK) message for transmission to the headend 210 over communication path 221.

In response, upon authorization of the decoder 220, the headend 210 transmits the requested program key (PK) in an encrypted format to the transmitter/receiver logic 320, which provides the encrypted PK to the processor 230. The processor 230 may store the encrypted PK in the memory 235 and/or provide the encrypted PK to the descrambler IC 240 for descrambling incoming scrambled content in real-time. The decrypted PK may be used to decrypt an entitlement control message (ECM) sent in-band which could be decrypted in subsequent steps in the descrambler IC 240. But, an ECM is not necessary. The memory 235 is an optional component for use if it is desirable to store the encrypted PK locally. Where the encrypted PK is not stored locally but is accessed from the headend 210 as needed, the memory 235 may be removed from the decoder 220.

Upon receiving the scrambled content of the program data, the descrambler IC 240 descrambles such content, which is subsequently supplied to the MPEG decoder 330 if the content is compressed with a MPEG format. The MPEG decoder 330 decompresses the digital content and subsequently routes the decompressed digital content to either a digital-to-analog (D/A) converter for display on a television, a Digital Video Interface (DVI) link or a network interface (e.g., IEEE 1394 link).

As shown, the processor 230, memory 235, descrambler IC 240, MPEG demultiplexer 310, transmitter/receiver logic 320 and MPEG decoder 330 may be implemented on two or more integrated circuits interconnected through bus traces or another communication scheme (e.g., wires, optical fiber, etc.). Alternatively, these components may be implemented on a single integrated circuit.

In this embodiment, the PK may be valid for a certain period of time. The decoder 220 may store the PK in the memory 235, allowing the decoder 220 to re-access the service when PK is still valid. In this embodiment, the PK is stored in encrypted form (as it comes over the network from the headend 210) in the memory 235.

The PK may be valid for the duration of a program or it may be valid for a selected period of time, e.g. six hours. Using a key for a longer period of time will reduce the overall number of transactions between the decoder 220 and the headend 210 because, once the key is stored in the memory 235 of the decoder 220, it is readily available. Depending on the duration of the current program key (e.g., PK), the next Program Key (PKnext) may be delivered along with the PK, both may be in encrypted format. Alternatively, the decoder 220 may request the PKnext after detecting the end of the PK's valid epoch (e.g., time duration of the PK). In one embodiment, the program key is valid for the duration of a user's subscription period.

The program key should be identified properly so that it may be applied to a channel being tuned to. According to one embodiment, when the decoder 220 tunes to a channel, it looks up the appropriate encrypted program key from the memory 235 and writes that into the Odd/Even MPEG key register of the descrambler IC 240. As in the embodiment of FIG. 2, the secret Unique Key information may be programmed into the descrambler IC 240 when decoder 220 is manufactured.

In one embodiment, one type of program key, namely a service key, may comprise 56-bit, 112-bit, or 168-bit keys. Table 1 shows the storage requirements for different sizes of keys.

TABLE 1

Number of Bytes to Store Independent Service Keys

| Number of Channels with Independent Keys | Channel ID (3 Bytes) | 16 Byte Triple DES Encrypted Service Key CURRENT | 16 Byte Triple DES Encrypted Service Key NEXT | Total Bytes |
| --- | --- | --- | --- | --- |
| 20 | 60 | 320 | 320 | 700 |
| 50 | 150 | 800 | 800 | 1,750 |
| 100 | 300 | 1600 | 1600 | 3,500 |
| 200 | 600 | 3200 | 3200 | 7,000 |
| 400 | 1200 | 6400 | 6400 | 14,000 |

Figure 6:
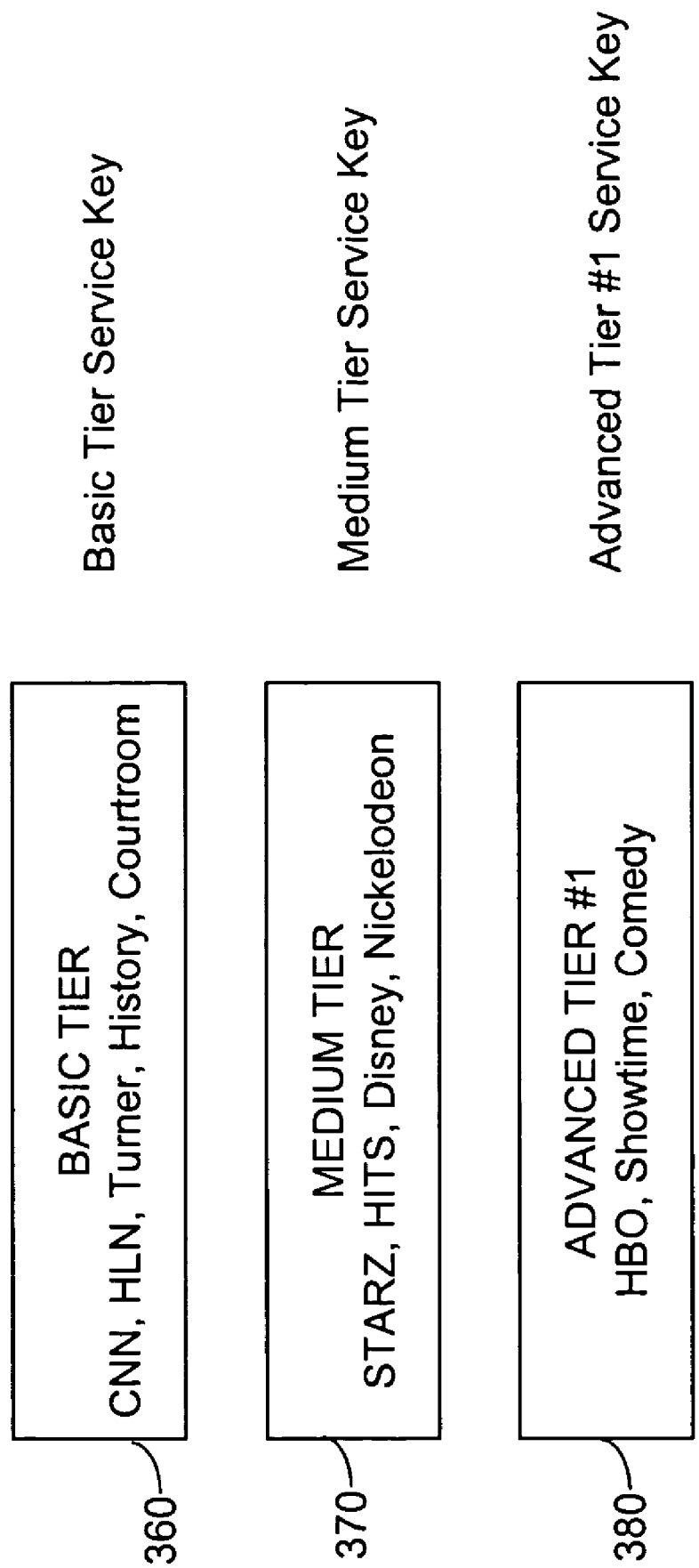
FIG. 6 is an exemplary embodiment of services that may be delivered to the decoder of FIG. 2.

Services can be sold a-la-carte or sold as a bouquet or package. There may be several tiers of services, each identified by a Service ID. For example, there may be a basic tier of services 360, a medium tier 370 offering more services, and advanced tiers 370 offering different premium services, as shown in FIG. 6. In this embodiment, each incremental tier of services may be given a separate program key.

From Table 1 above, if a customer where to subscribe to 20 different types of Service tiers, that would require 60 bytes of ID storage, 320 bytes of storage of the currently valid service keys, 320 bytes of storage for the service keys valid for the next epoch (or billing period) for a total of 700 bytes.

Figure 7:
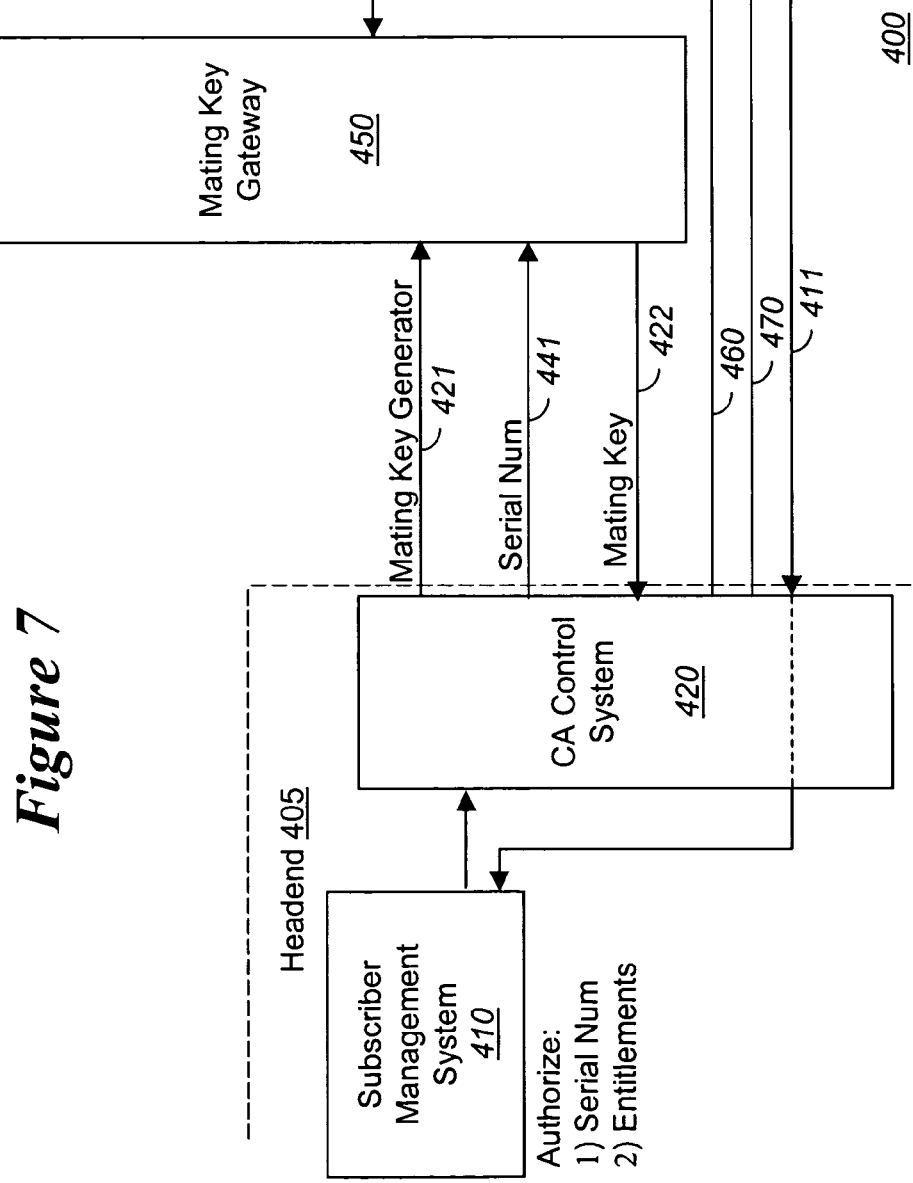
FIG. 7 is a third exemplary embodiment of a secure content delivery system.

Referring now to FIG. 7, a third exemplary embodiment of a secure content delivery system 400 is shown. The secure content delivery system 400 comprises a headend 405, either a plurality of mating key servers associated with different device manufacturers $430_1$-$430_N$ ($N \geq 2$) or a trusted third party 435, a digital device 440 and a mating key gateway 450.

Herein, headend 405 comprises a subscriber management system 410 and a Conditional Access (CA) control system 420 as described below.

Although not shown, it is contemplated that the CA control system 420 could be configured to perform a lookup of databases containing serial numbers of the digital devices, thereby eliminating required implementation of and access to the subscriber management system 410.

Figure 8:
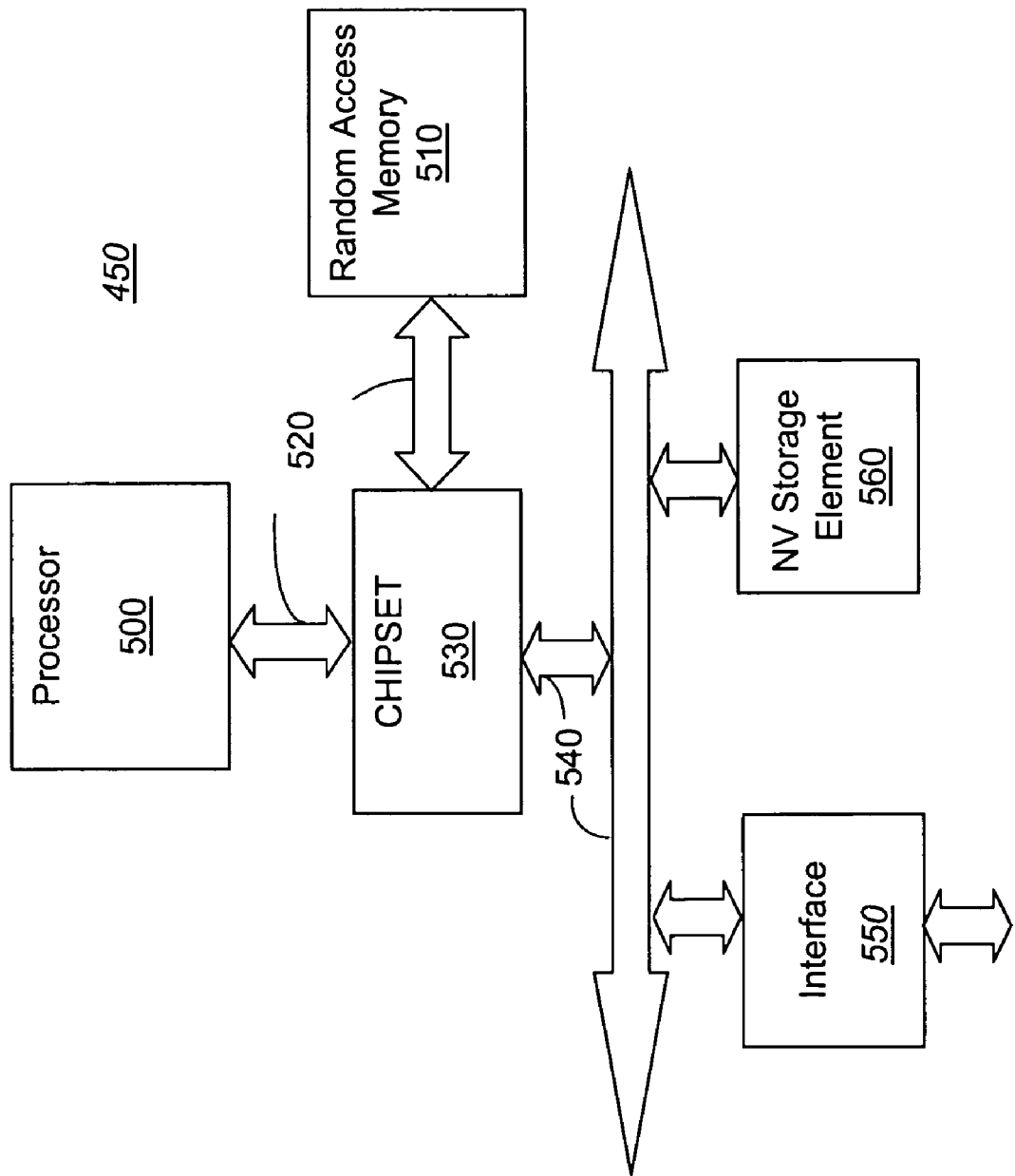
FIG. 8 is an exemplary embodiment of the mating key gateway in communications between the headend and a source of the mating keys.

As shown in FIG. 8, the mating key gateway 450 comprises a processor 500, a random access memory 510 coupled to the processor 500 via a first bus 520 (a processor bus) and a chipset 530 that couples the first bus 520 to a second bus 540 (e.g., an input/output "I/O" bus). Second bus 540 is coupled to an interface 550 that is adapted to receive signaling from one or more of the following: (1) headend 405, (2) any of the servers $430_1, \ldots,$ and/or $430_N$ supported by a supplier (e.g., digital device manufacturer, distributor, etc.), and (3) trusted third party 435. The interface 550 may be a modem, a networking card, or other communication logic that supports communications with a physically distant unit (e.g., headend 405, mating key servers $430_1$-$430_N$, trusted third party 435, etc.). These communications may identify the unit through dynamic or static addresses (e.g., media access control "MAC" addresses, Internet Protocol "IP addresses and the like).

The second bus 540 also supports a non-volatile (NV) storage unit 560 such as a hard disk drive, an optical drive, an opto-electric device (e.g., compact disk player, digital versatile disk "DVD" player, etc.). NV storage unit 560 is configured to store a mating key lookup table as described in FIGS. 9A-9C.

Figure 9A:
FIG. 9A a first exemplary embodiment of a mating key lookup table stored within the storage unit of FIG. 8.

Referring now to FIG. 9A, a first exemplary embodiment of a mating key lookup table stored within the storage unit 560 of FIG. 8 is shown. The storage unit 560 stores a mating key lookup table 570 that features a first group of entries 572 forming a range of serial numbers associated with each digital device supplied by an entity (e.g., manufacturer, distributor, etc.). In addition, the lookup table 570 further comprises a second group of entries 574, each corresponding to one serial number and identifying an address used to establish communications with an appropriate mating key server. For instance, all serial numbers with the most significant byte value equivalent to "00" (grouping 576) designate that at least the mating key generator accompanying the serial number is transmitted to a mating key server associated with or controlled by one of the entities such as Sony Corporation for this embodiment.

Figure 9B:
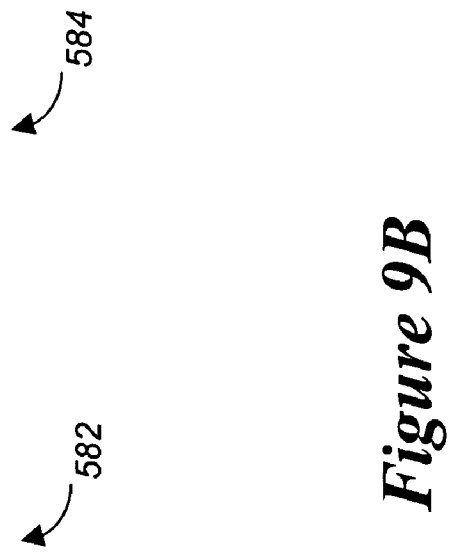
FIG. 9B a second exemplary embodiment of a mating key lookup table stored within the storage unit of FIG. 8.

Referring to FIG. 9B, in the alternative, the storage unit 560 may be adapted to store a mating key lookup table 580 that features a first group of entries 582 forming a range of mating key generators associated with each digital device provided by a supplier (e.g., manufacturer, distributor, etc.). As described below in FIG. 10, each mating key generator comprises an identifier of a supplier, such as a Manufacturer ID for example, which can be used to identify an intended recipient of the mating key generator. A second group of entries 584 is arranged to identify an address for establishing communications with a mating key server associated with or supported by the identified manufacturer. For instance, in response to a selected portion (e.g., first byte) of the mating key generator having a predetermined value, the mating key generator is transmitted to a mating key server associated with or controlled by a predetermined entity (e.g., Sony Corporation as shown).

Referring now to FIG. 9C, as another alternative embodiment, the storage unit 560 may be adapted to store a mating key lookup table 590 that features a first group of entries 592 along with a correspond second group of entries 594. The first group of entries 592 features received mating key generators "MKG" while the second group 594 features one or more mating keys corresponding to the particular mating key generator. The mating key(s) may be received from the trusted third party 435 or at least one of the mating key servers $430i$ ($1 \leq i \leq N$) as shown in FIG. 7 and described below.

Referring back to FIG. 7, once a user of the digital device 440 desires to receive particular program data, the digital device 440 determines whether entitlements associated with the requested program data are already stored therein. If the entitlements are not stored, the user may be notified by a screen display and prompted to provide a request 411 (e.g., a RPK message over communication path 221) to the headend 405. The request 411 may be provided by the user via (i) an out-of-band (OOB) communication pathway (e.g., electronic mail over the Internet, or telephone call by the user, etc.) to the CA control system 420 in communication with digital device 440 as shown. Alternatively, the request 411 may be sent automatically or may be routed to CA control system 420 of headend 405, which performs a lookup of information to authorize the user substantially in real time.

For one embodiment, the request 411 is a message that comprises an identifier (e.g., an alphanumeric, or numeric code) of the requested content and a serial number of the digital device (referred to as "Serial Num"). Implemented as any information processing system (e.g., server, relay station or other equipment controlled by a service provider or content provider), the subscriber management system 410 processes the request 411 and determines what entitlements are to be provided to the digital device 440.

Upon receiving an authorization (AUTH) message 412 from the subscriber management system 410, which may include the Serial Num 441 and perhaps global keys (e.g., keys used to decrypt ECMs sent in-band with the content), the CA control system 420 routes the Serial Num 441 and a mating key generator 421 to the mating key gateway 450. For one embodiment of the invention, the mating key gateway 450 accesses the Manufacturer ID of the digital device 440 from the mating key generator 421 and appropriately routes the mating key generator 421 and Serial Num 441 to a selected mating key server 430i.

Alternatively, it is contemplated that the CA control system 420 may simply route the mating key generator 421 to the mating key gateway 450. The mating key gateway 450 accesses the Manufacturer ID from the mating key generator 421 which comprises a first portion that identifies a selected mating key server 430i to receive the mating key generator 421 and a second portion that identifies the particular digital device. The mating key server 430i uses the mating key generator 421 to produce the mating key 422 and returns the mating key 422 to the CA control system 420.

Alternatively, instead of the mating key gateway 450 routing the mating key generator 421 and optionally the Serial Num 441 to a selected mating key server 430i, it is contemplated that such information may be routed to the trusted third party 435, which accesses a database for retrieval of a mating key. The mating key is based on values associated with the mating key generator 421 and/or Serial Num 441. Each database may be allocated a range of values where values associated within the mating key generator 421 and/or the Serial Num 441 can be used to identify a targeted database from which the mating key 422 is accessed.

Prior to transmission of the Serial Num 441 and/or the mating key generator 421, the CA control system 420 may perform an authentication scheme with the mating key gateway 450. Also, authentication schemes may be performed between mating key gateway 450 and either a selected mating key server 430$i$ or the trusted third party 435. Each authentication schemes produces a session key that is used to encrypt information exchanged between the parties in order to provide a secure link there between. Examples of various types of authentication schemes include an exchange of digital certificates, digital signatures, hash values or the like.

Figure 10:
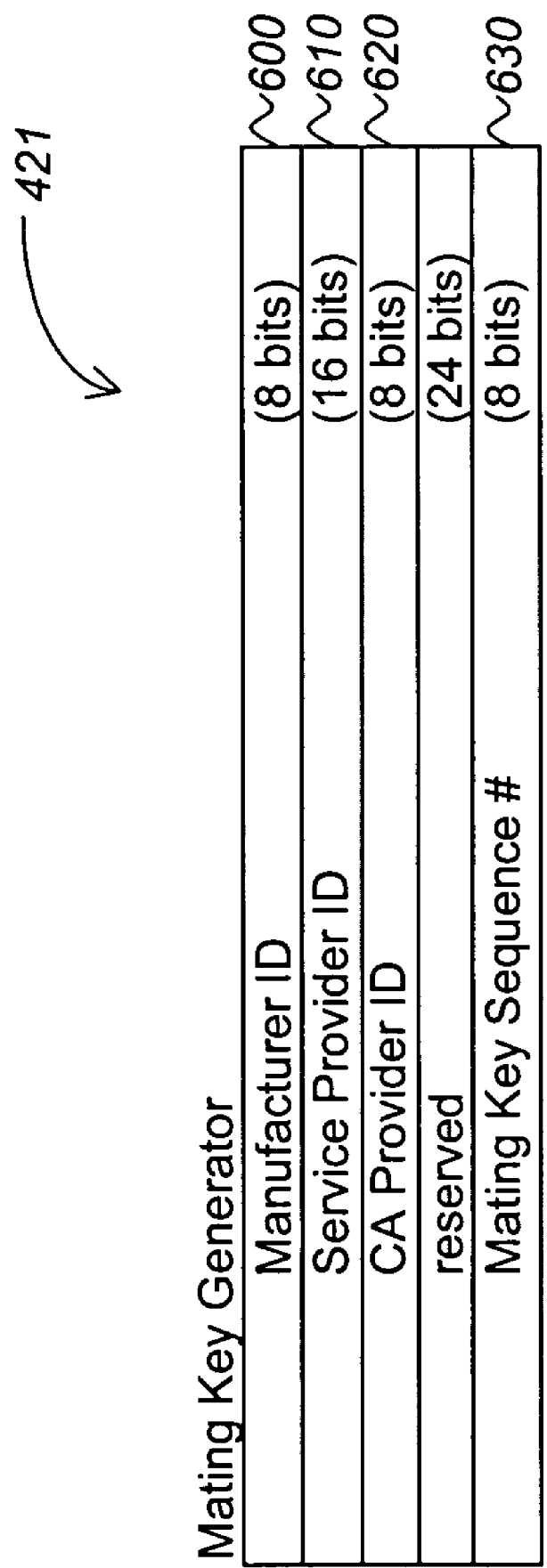
FIG. 10 is an exemplary embodiment of a data structure forming the mating key generator transmitted through a secure content delivery system.

As shown in FIG. 10, the mating key generator 421 is a message that comprises one or more of the following: a identifier of the supplier such as a Manufacturer ID 600, a Service Provider ID 610, a conditional access (CA) Provider ID 620 and a Mating Key Sequence Number 630. For this embodiment, "Manufacturer ID" 600 is a predetermined value that identifies a manufacturer of the digital device 440. Of course, it is contemplated that the Manufacturer ID 600 is optional, depending on the particular arrangement of the Serial Num 441. The "Service Provider ID" 610 is a value (e.g., one or more bits such as 16-bits) that identifies the communications system provider as well as the selected distribution mechanism. For example, the Service Provider ID 610 may identify which cable, satellite, terrestrial or Internet company is supplying the requested program data and/or the particular head-end server of that company.

The "CA Provider ID" 620 indicates the provider of the CA control system 420. The "Mating Key Sequence Number" 630 is used for aging purposes in order to indicate expiration of the mating key generator 421.

Referring back to FIG. 7, the Serial Num 441 may have a unique portion for each Manufacturer ID 600 in order to identify the mating key server $430_1, \ldots,$ or $430_N$ (or database of trusted third party 435) to which access is sought. Alternatively, the Serial Num 441 may be expanded to include a serial number of the digital device 440 as well as a code field to identify the manufacturer of that digital device 440. Hence, the Manufacturer ID 600 may be excluded from the mating key generator 421. Of course, the number of bits is a design choice.

Upon receipt of the mating key generator 421 and the Serial Num 441, the appropriate mating key server (e.g., server 430$i$, where i≧1) or trusted third party 435 returns one or more mating keys 422. The mating key 422 may be generated based on computations involving a one-time programmable (OTP) key value some or all of the information supplied by the mating key generator 421. For instance, as previously shown in FIGS. 2 and 5, the OTP value is identical to the Unique Key stored in internal memory 250 of the descrambler IC 240. At least a portion of information from the mating key generator 421, namely the Manufacturer ID 600, Service Provider ID 610, CA Provider 620, Mating Key Sequence Number 630 of FIG. 10 or any combination thereof, undergoes a computation (e.g., encryption, hashing, etc.) with the OTP value to produce the mating key 422. According to one embodiment, the OTP value may be located using the Serial Num 441.

In one embodiment of the invention, the mating key 422 is used to encrypt a program key (e.g., control word, service key, etc.) needed to descramble scrambled content being sent to the digital device 440. More specifically, according to one embodiment of the invention, the mating key server 430$i$ accesses a key being an identical copy of Unique Key 250 of FIG. 2 and encrypts or decrypts the mating key generator 421 using the accessed key. This produces the mating key 422. Alternatively, it is contemplated that the mating key generator 421 may undergo a one-way hash operation in which the result is encrypted or decrypted, or a portion of the mating key generator 421 encrypted or decrypted in lieu of the entire message 421 being encrypted or decrypted.

Upon receipt of the mating key 422, the CA control system 420 generates an entitlement management message (EMM) 460 along with one or more ECMs 470. One embodiment of EMM 460 is illustrated in FIG. 11. Moreover, as an optional function, the CA control system 420 may produce derivative keys of the mating key 422. These derivative keys are used to encrypt a corresponding number of program keys, which after encryption, are sent to the digital device 440 for subsequent descrambling operations.

As shown in FIG. 11, EMM 460 comprises at least two of the following: Serial Num 441, EMM length field 700, mating key generator 421, "M" (M≧1) key identifiers $710_1$-$710_M$ and encrypted service keys $720_1$-$720_M$ associated with the key identifiers $710_1$-$710_M$, respectively. Of course, the size (in bits) of these values can be varied and other types of entitlements 730 besides identifiers or service keys may be included in the EMM 460. Also, it is contemplated that the mating key generator 421 may be excluded from the EMM 460 and sent separately and generally concurrent with the EMM 460. Of course, the size (in bits) of these values/fields can be varied.

The Serial Num 441 is a value that is used to indicate a particular digital device and perhaps the manufacturer of the set-top box. It may be the identification of the smart card (if used), or public identification number of the descrambler IC 240. The "EMM length field" 700 is a bit value that is used to indicate the length of the EMM 460. The mating key generator 421, as shown, is a bit value that includes the parameters forth above in FIG. 10. Each "key identifier" $710_1$-$7104_M$ is a 16-bit value that indicates a tier of service associated with a corresponding encrypted service key $720_1$-$720_M$, respectively. The encrypted service keys $720_1$-$720_M$ are decrypted by a key produced within the descrambler IC 240 that is identical to the mating key 422 as shown in FIG. 7.

Figure 12:
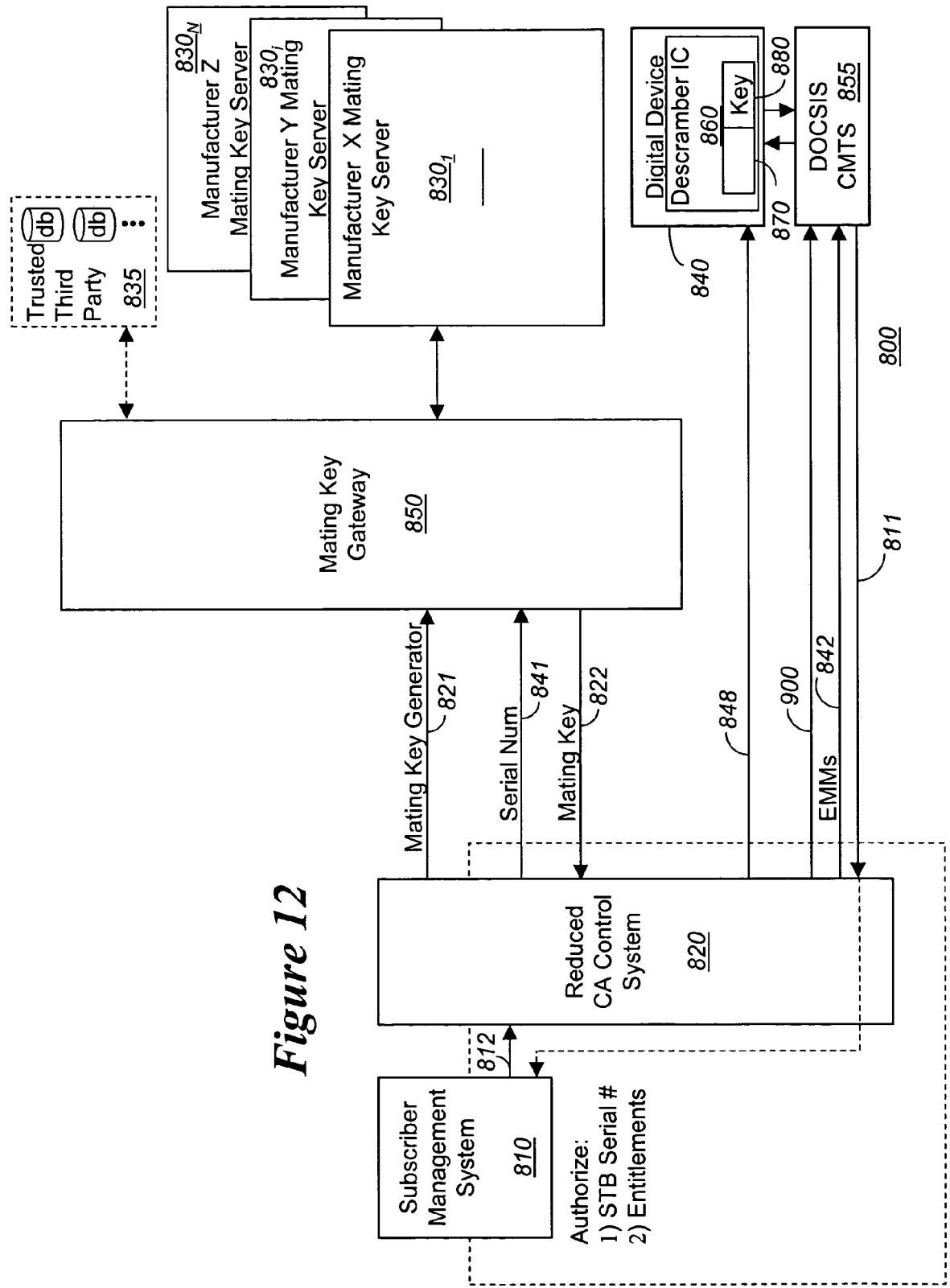
FIG. 12 is a fourth exemplary embodiment of a secure content delivery system.

FIG. 12 is a fourth exemplary embodiment of a secure content delivery system 800. The secure content delivery system 800 comprises a subscriber management system 810 and a CA control system 820, a plurality of mating key servers $830_1$-$830_N$ and/or trusted third party 835, a digital device 840, a mating key gateway 850 (similar to gateway 450 of FIG. 7), and a network interface 860 (e.g., DOCSIS CMTS). The digital device 840 comprises a descrambler IC 860 including local memory 870 configured to store a unique key 880 of the digital device 840.

The digital device 840 receives electronic program guide (EPG) meta-data with the EPG in an unscrambled format and digital content 848 in a scrambled format. According to one embodiment of the invention, the EPG meta-data 900 is provided out-of-band by CA control system 820. It is contemplated, however, that the EPG meta-data 900 may be provided in-band. The EPG meta-data 900 may preclude the need to send ECMs in-band. If ECMs are sent, then they can deliver faster changing keys which can be processed in multiple iterations in decryption block 260.

Figure 13:
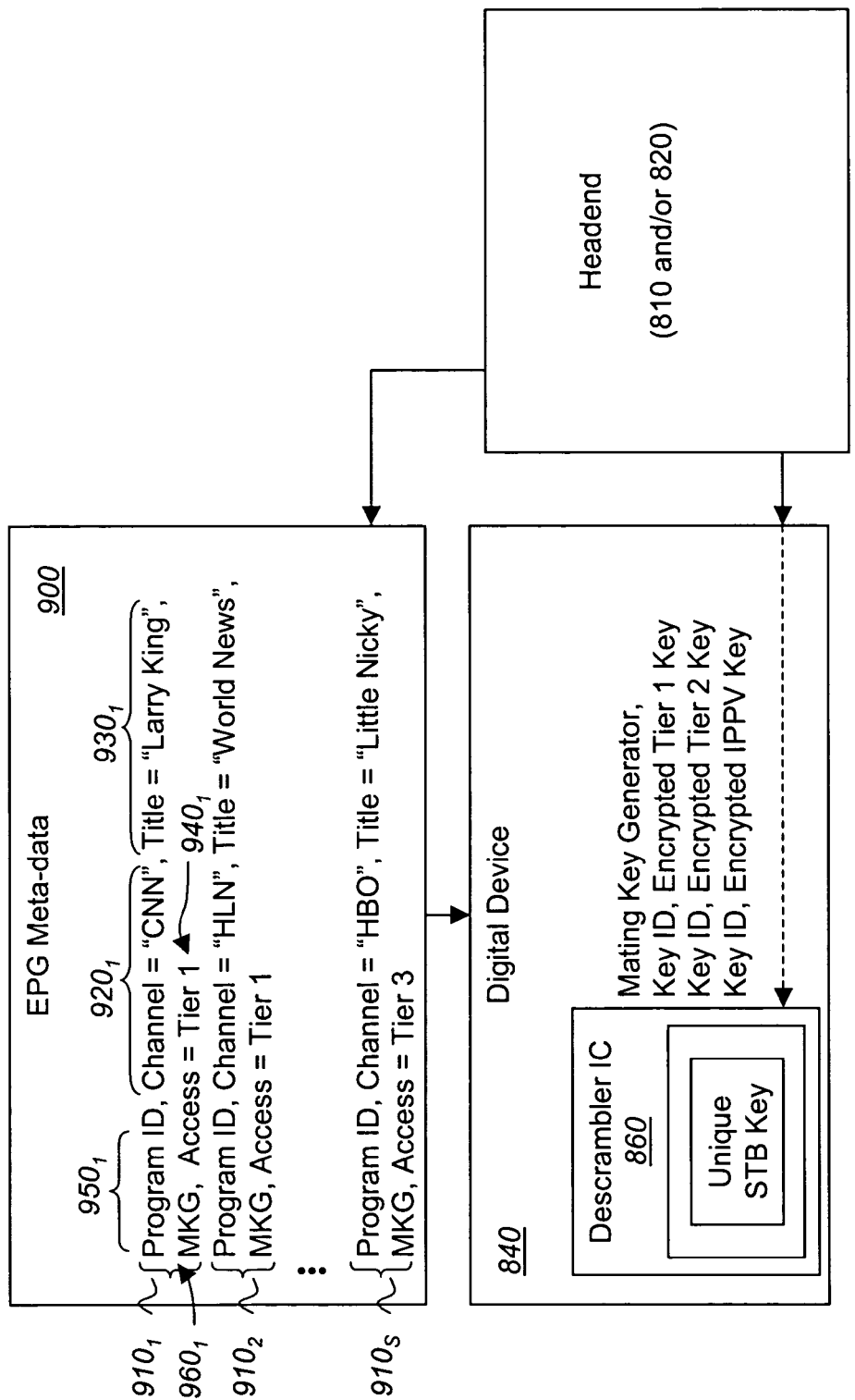
FIG. 13 is an exemplary embodiment of meta-data associated with an electronic program guide (EPG) routed to a digital device.

As shown in FIG. 13, one embodiment of the EPG meta-data 900 includes multiple tag entries $910_1$-$910_s$ (S≧1) for different types of content provided by a service provider. Each tag entry (e.g., tag entry $910_j$) comprises at least a channel name $920_1$, a name of the content 9301, and a key identifier $940_1$ indicating the tier of service associated with the channel. In addition, each tag entry $910_1$ further comprises a program identifier (PID) $950_1$ and a mating key generator (MKG) $960_1$.

Referring back to FIG. 12, once a user of the digital device 840 desires to receive particular type of content (e.g., PPV movie, broadcast channel, etc.), the digital device 840 determines whether entitlements associated with the requested content are already stored therein. If the entitlements are not stored, the user may be either (1) notified directly through a screen display or audio playback and prompted to provide a request 811 to the subscriber management system 810 (or CA control system 820) or (2) the request 811 may be sent automatically. The request 811 may be provided out-of-band (e.g., telephone call or e-mail over Internet) or in-band (depression of order button on remote for transmission to subscriber management system 810 via CA control system 820).

Herein, the request 811 may be a message (e.g., RPK message) that comprises a serial number of the set-top box (referred to as "Serial Num") and an identifier (e.g., an alphanumeric or numeric code) of the requested content. The subscriber management system 810 processes the request 811 and determines what entitlements are to be provided to the digital device 840.

Upon receiving an authorization (AUTH) message 812 from the subscriber management system 810, including the Serial Num 841, information for constructing a mating key generator 821, and entitlements for constructing an EMM, the CA control system 820 routes the Serial Num 841 and the mating key generator 821 to the mating key gateway 850. The mating key gateway 850 operates as an intermediary to coordinate delivery of a mating key 822 that is used to extract the requested content from downloaded, scrambled information as shown in FIGS. 8 and 9A-9C. Upon receipt of the mating key 822, the CA control system 820 generates one or more EMMs 842 as described above.

Prior to transmission of the mating key generator 821 and/or Serial Num 841, or elements of these messages are described above, the CA control system 820 may perform an authentication scheme with the mating key gateway 850 in order to establish a session key to enable secure communications between them.

Figure 14:
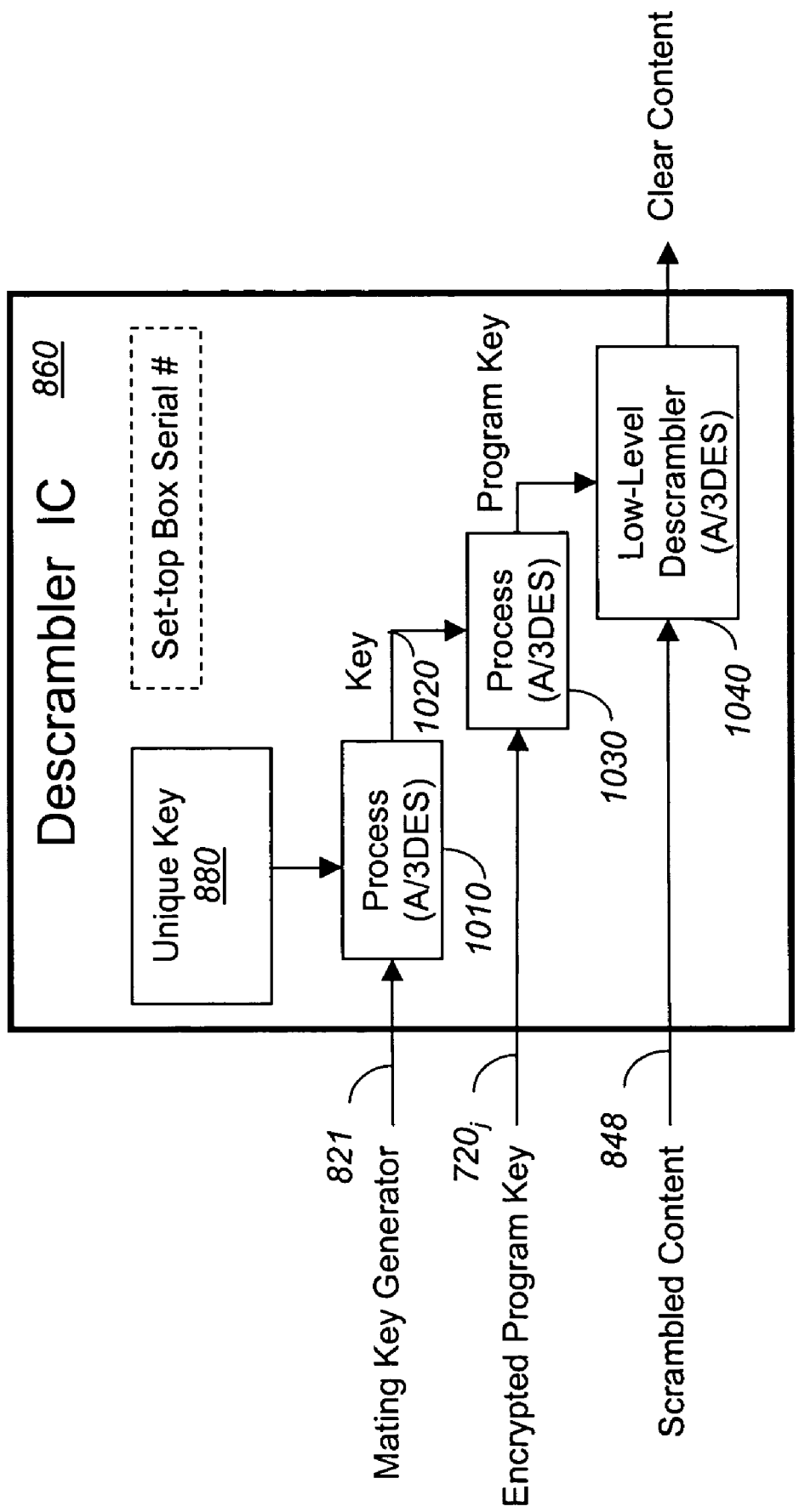
FIG. 14 is a first exemplary embodiment of the descrambler IC adapted for implementation within a decoder of the digital devices set forth in the systems of FIGS. 2, 7, and 12.

FIG. 14 is a first exemplary embodiment of the descrambler IC 860 implemented within the digital device 840 of FIG. 12. The descrambler IC 860 may be equivalent to construction as descrambler IC 240 of FIGS. 2, 5 and 7. The descrambler IC 860 comprises at least two process blocks 1010 and 1030 and at least one descrambler unit 1040.

On receipt of the mating key generator 821 and the encrypted program keys 720j ($1 \leq j \leq M$), perhaps included in the EMM 842, the first process block 1010 of the descrambler IC 860 performs an encryption or decryption operation on the mating key generator 821 using the Unique Key 880 previously stored in the descrambler IC 860. The encryption or decryption operation may be in accordance with symmetric key cryptographic functions such as DES, AES, IDEA, 3DES and the like. Of course, it is contemplated that the first process block 1010 may be altered to perform a hashing function in lieu of an encryption function.

The encryption or decryption operation on the mating key generator 821 produces a key 1020 identical to the mating key 822. The key 1020 is loaded into the second process block 1030 and is used to decrypt the encrypted program key 720j. This recovers the program key used to descramble the scrambled content 848 loaded into the descrambler IC 860. Descrambling may include performance of 3DES or AES operations on the scrambled content. The result may be content in a clear format, which is transmitted from the descrambler IC 860 and subsequently loaded into a MPEG decoder as shown in FIG. 5 or optionally into a D/A converter, DVI Interface or IEEE 1394 interface.

Figure 15:
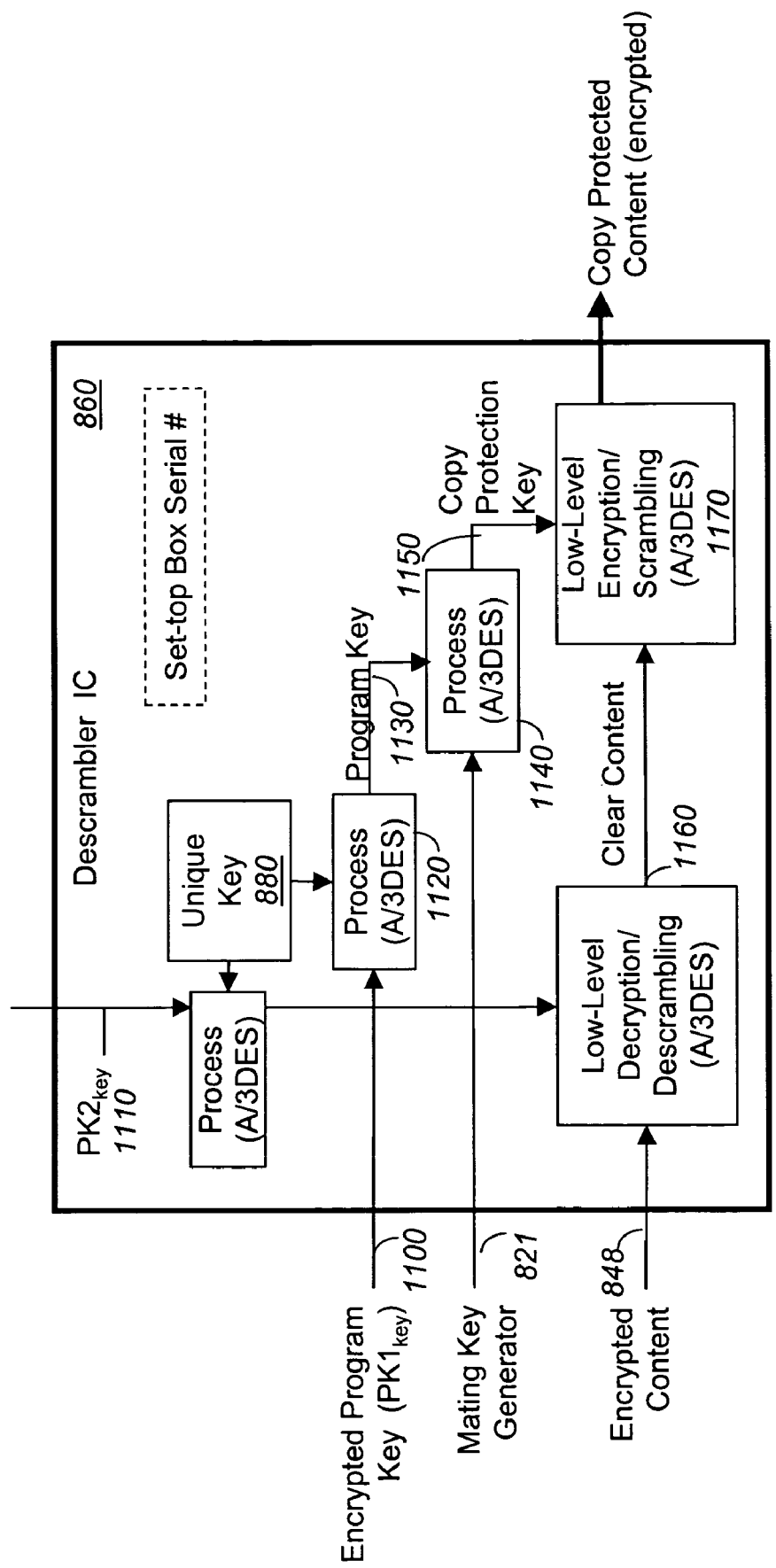
FIG. 15 is a second exemplary embodiment of the descrambler IC adapted for implementation within a decoder of the digital devices set forth in the systems of FIGS. 2, 7, and 12.

As further shown in FIG. 15, an embodiment of the descrambler IC 860 receives a first encrypted program key (PK1$_{key}$) 1100, the mating key generator 821 and a second encrypted program key 1110 from a second source. The descrambler IC 860 comprises a first process block 1120 that decrypts PK1$_{key}$ 1100 with the Unique Key 880 in accordance with symmetric key cryptographic functions such as AES or 3DES (referred to as "A/3DES") for example.

The decryption operation on PK1$_{key}$ 1100 recovers a program key 1130, which is loaded into a second process block 1140 that is used to encrypt mating key generator 821 to produce the copy protection key 1150. PK2$_{key}$ 1110 is decrypted by a using the Unique Key 880 (or derivative thereof) to recover the program key in a clear format. The incoming encrypted content 848 is decrypted and/or descrambled within low-level decryption/descrambling logic 1160 of the descrambler IC 860. Decrypting and/or descrambling may include performance of AES or 3DES operations.

As a result, the content is temporarily placed in a clear format, but is routed to low-level encryption/scrambling logic 1170, which encrypts the descrambled content with the copy protection key 1150 associated with any or all of the destination digital devices. As a result, the content is secure during subsequent transmissions.

Figure 16:
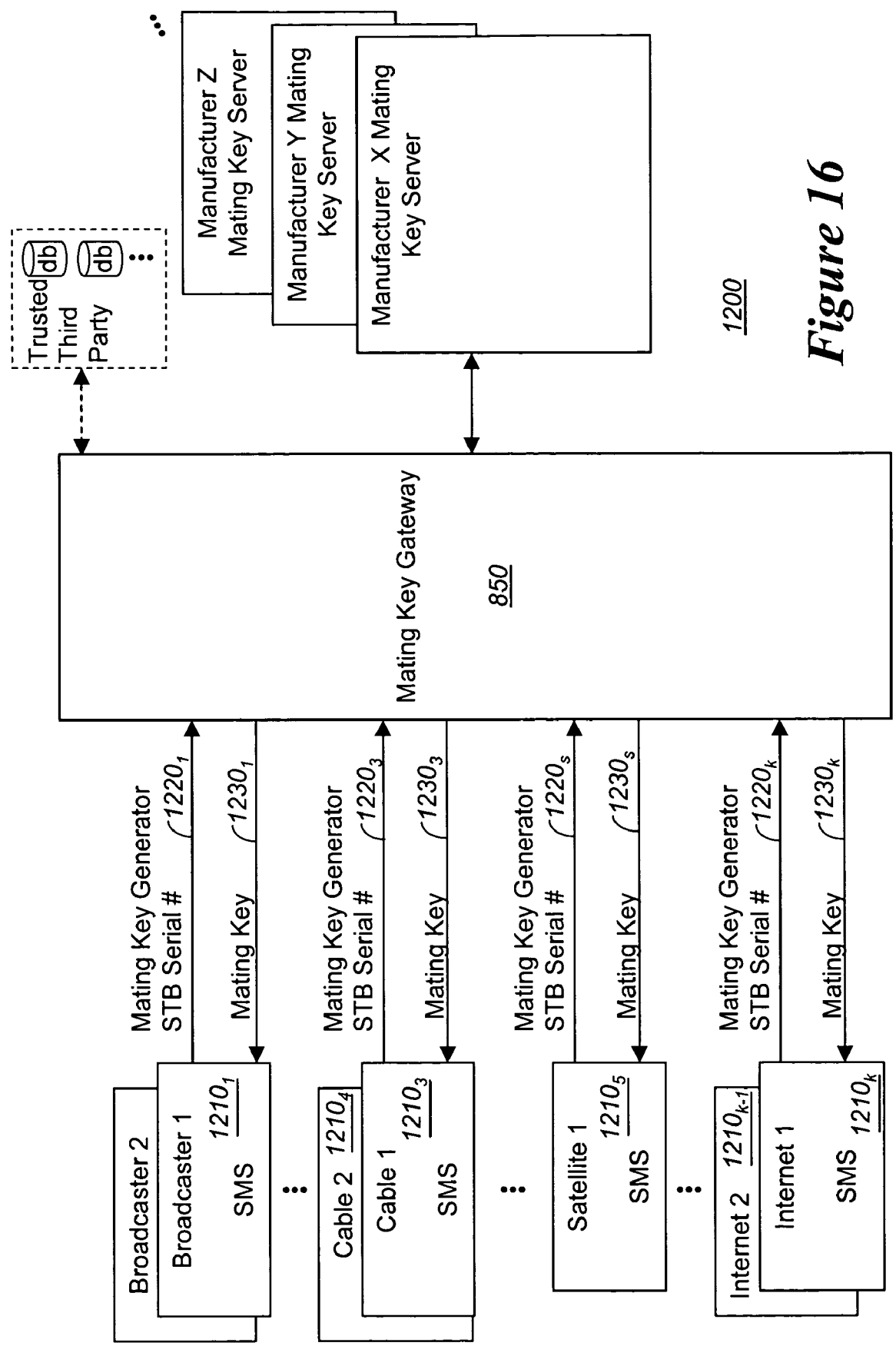
FIG. 16 is a portion of a fifth exemplary embodiment of a secure content delivery system.

Referring now to FIG. 16, a portion of a fifth exemplary embodiment of a secure content delivery system 1200 is shown. In lieu of the subscriber management system 810 and the CA control system 820 of FIG. 12, mating key gateway 850 may be adapted for communications with a plurality of subscriber management systems (SMS) 1210$_1$-1210$_K$ ($K \geq 1$) each associated with a different service provider. Each of these subscriber management systems 1210$_1$-1210$_K$ supply mating key generators and Serial Nums 1220$_1$-1220$_K$ to mating key gateway 850 and, in return, receive corresponding mating keys 1230$_1$-1230$_K$. These mating keys 1230$_1$-1230$_K$ are used to encrypt program keys provided to one or more targeted digital devices (not shown). Alternatively, the trusted third party 435/835 may be utilized as shown in FIGS. 7, 12 and 16.

For example, for this illustrated embodiment, subscriber management systems 1210$_1$ and 1210$_2$ are terrestrial broadcasters, each providing mating key generators and Serial Nums 1220$_1$, 1220$_2$ to mating key gateway 850 and receiving corresponding mating keys 1230$_1$, 1230$_2$. Similar in operation, subscriber management systems 1210$_3$ and 1210$_4$ are cable operators, subscriber management system 1210$_5$ is a direct broadcast satellite (DBS) company, and subscriber management systems 1210$_{K-1}$ and 1210$_K$ are Internet content sources.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illus rather than in a restrictive sense.

What is claimed is:

1. A mating key gateway adapted to retrieve at least one mating key used to encrypt a program key that is used to scramble digital content prior to transmission to a digital device, comprising;

a bus;

a processor coupled to the bus;

an interface coupled to the bus, the interface being adapted to receive information from (1) a sender of the digital content and (2) either a server controlled by a supplier of the digital device or a trusted third party, the information received by the interface from the sender comprises a mating key generator being a message that comprises an identifier of the supplier; and a non-volatile storage unit coupled to the bus, the non-volatile storage unit to store a mating key lookup table to identify either the server controlled by the supplier of the digital device or the trusted third party, based on the information received from the sender, from which the at least one mating key is supplied, the mating key lookup table stored by the non-volatile storage unit comprises (i) a first group of entries forming a range of mating key generators for digital devices supplied by each supplier of a plurality of suppliers including the supplier, and (ii) a second group of entries corresponding to the first group of entries, each entry of the second group of entries including at least one mating key uniquely corresponding to and formed by at least a portion of one of the mating key generators.

2. The mating key gateway of claim 1, wherein the interface to receive the information from the sender being one of a cable provider, a satellite-based provider, a terrestrial-based provider, an Internet service provider and a conditional access (CA) provider operating with one of the cable provider, the satellite-based provider, the terrestrial-based provider and the Internet service provider.

3. The mating key gateway of claim 2, wherein the interface to receive information from the supplier being a manufacturer of the digital device.

4. The mating key gateway of claim 1, wherein the mating key generator received by the interface further comprises an identifier of a provider of a system that enables transmission of both the digital content and the mating key generator to the digital device.

5. The mating key gateway of claim 4, wherein the mating key generator received by the interface further comprises (i) an identifier that identifies a conditional access (CA) system provider over which the digital content and the mating key generator are transmitted, and (ii) a mating key sequence number.

6. The mating key gateway of claim 1, wherein the mating key lookup table stored by the non-volatile storage unit comprises (i) a first group of entries forming a range of serial numbers for digital devices supplied by each supplier of a plurality of suppliers including the supplier, and (ii) a second group of entries corresponding to the first group of entries, each entry of the second group of entries including information to establish communications with a sewer controlled by one of the plurality of suppliers.

7. The mating key gateway of claim 1, wherein the mating key lookup table stored by the non-volatile storage unit comprises (i) a first group of entries forming a range of serial numbers for digital devices supplied by each supplier of a plurality of suppliers including the supplier, and (ii) a second group of entries corresponding to the first group of entries, each entry of the second group of entries including an address to establish communications with a trusted third party authorized by one of the plurality of suppliers.

8. The mating key gateway of claim 1, wherein the mating key lookup table stored by the non-volatile storage unit comprises (i) a first group of entries forming a range of mating key generators for digital devices supplied by each supplier of a plurality of suppliers including the supplier and the at least one mating key being formed using at least a portion of one of the mating key generators, and (ii) a second group of entries corresponding to the first group of entries, each entry of the second group of entries including information to establish communications with a server controlled by one of the plurality of suppliers.

9. The mating key gateway of claim 8, wherein the information includes an address to establish communications over a network.

10. A mating key gateway adapted to retrieve a mating key used to encrypt a program key that is used to scramble digital content prior to transmission to a digital device, the mating key gateway comprising:
a processor;
an interface in communication with the processor, the interface being adapted to exchange information with (1) a headend and (2) a server configured to store a mating key associated with the digital device; and
a non-volatile storage unit to store a mating key lookup table to identify the server based on the information received from the headend, the information received from the headend includes a mating key generator being a message that comprises an identifier of the manufacturer of the digital device and the mating key being formed using at least a portion of the mating key generator.

11. The mating key gateway of claim 10, wherein the interface receives the mating key from the server being controlled by a manufacturer of the digital device.

12. The mating key gateway of claim 10, wherein the mating key generator received by the interface further comprises (i) an identifier that identifies a conditional access (CA) system provider over which the digital content and the mating key generator are transmitted, and (ii) a mating key sequence number.

13. The mating key gateway of claim 10, wherein the mating key lookup table stored by the non-volatile storage unit comprises (i) a first group of entries forming a range of serial numbers of digital devices supplied by each of a plurality of manufacturers, and (ii) a second group of entries corresponding to the first group of entries, each entry of the second group of entries including information to establish communications with a server controlled by one of the plurality of manufacturers.

14. The mating key gateway of claim 13, wherein the server controlled by one of the plurality of manufacturers is the server.

15. The mating key gateway of claim 10, wherein the mating key lookup table stored by the non-volatile storage unit comprises (i) a first group of entries forming a range of mating key generators associated with digital devices supplied by each of a plurality of manufacturers, and (ii) a second group of entries corresponding to the first group of entries, each entry of the second group of entries including information to establish communications with a server controlled by one of the plurality of manufacturers.

16. The mating key gateway of claim 15, wherein the information includes an address to establish communications over a network.

17. The mating key gateway of claim 10 being adapted to additionally store mating keys for selected digital devices.

18. A secure content delivery system comprising:
a trusted third party to store a plurality of mating keys associated with digital devices, each mating key being used to encrypt a program key that is used to scramble digital content; and
a mating key gateway in communications with the trusted third party, the mating key gateway to provide information received from a headend to the trusted third party for retrieval of a requested mating key that is computed using the information received from the headend, the information provided to the trusted third party comprises a mating key generator being a message that comprises an identifier of a supplier of one of the digital devices and the mating key generator undergoing a hash operation to produce the requested mating key.

19. The secure content delivery system of claim 18, wherein the identifier of the supplier included in the mating key generator identifies a manufacturer of the one of the digital devices.

20. The secure content delivery system of claim 18, wherein the mating key generator provided to the trusted third party further comprises an identifier of a provider of the secure content delivery system that enables transmission of both the digital content and the mating key generator to the one of the digital devices.

21. The secure content delivery system of claim 18, wherein the mating key generator provided to the trusted third party further comprises (i) an identifier that identifies a conditional access (CA) system provider over which the digital content and the mating key generator are transmitted, and (ii) a mating key sequence number.

22. A method comprising:
receiving a mating key generator;
receiving a serial number being used to locate an one-time programmable value;
computing a mating key by performing a computation on the mating key generator and the one-time programmable value to produce the mating key; and
outputting the mating key based on the mating key generator being a message including at least one of (i) a first identifier to identify a manufacturer of the digital device, (ii) a service provider identifier, (iii) a conditional access provider identifier, and (iv) a mating key sequence number and the one-time programmable value being identical to a key stored in a digital device of a set-top box targeted to receive information encrypted with either the mating key or a derivative of the mating key.

* * * * *